(12) United States Patent
Walton

(10) Patent No.: US 6,459,433 B1
(45) Date of Patent: *Oct. 1, 2002

(54) METHOD AND APPARATUS FOR COMPRESSION OF A TWO DIMENSIONAL VIDEO OBJECT

(75) Inventor: Derek T. Walton, Bolton, MA (US)

(73) Assignee: ATI Technologies, Inc., Thornhill (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/846,423

(22) Filed: Apr. 30, 1997

(51) Int. Cl.[7] .............................................. G06T 11/40
(52) U.S. Cl. ...................................... 345/582; 345/419
(58) Field of Search ................................ 345/114, 115, 345/419, 429, 430, 431, 516, 521, 582, 583, 584, 589; 382/253

(56) References Cited

U.S. PATENT DOCUMENTS 5,424,755 A * 6/1995 Lucas et al. ................ 345/155
5,468,069 A * 11/1995 Presanna et al. ............ 382/253
5,822,465 A * 10/1998 Normile et al. ............. 382/253

* cited by examiner

Primary Examiner—Matthew Luu
(74) Attorney, Agent, or Firm—Vedder, Price, Kaufman & Kammholz

(57) ABSTRACT

A method and apparatus for compression of a two dimensional video object such that the video object may subsequently be displayed as a three dimensional object is generally accomplished by a set-up engine which receives vertex parameters and generates a plurality of derivatives and Bresenham parameters, therefrom. The derivatives and Bresenham parameters are provided to an edgewalker circuit which produces, therefrom, a plurality of spans which, in turn, is converted in to a set of texel addresses by a texel address generator. A texel fetch circuit receives the set of texel addresses and uses the addresses to retrieve a set of texels, which is subsequently processed by a texel processor to produce a filtered pixel. To retrieve the set of texels, the texel fetch circuit retrieves a set of indexes based on the texel addresses and uses the set of texels to retrieve the set of texels from a codebook. The retrieval of the set of indexes and the indexing of the codebook is executed within two consecutive clock cycles.

39 Claims, 17 Drawing Sheets

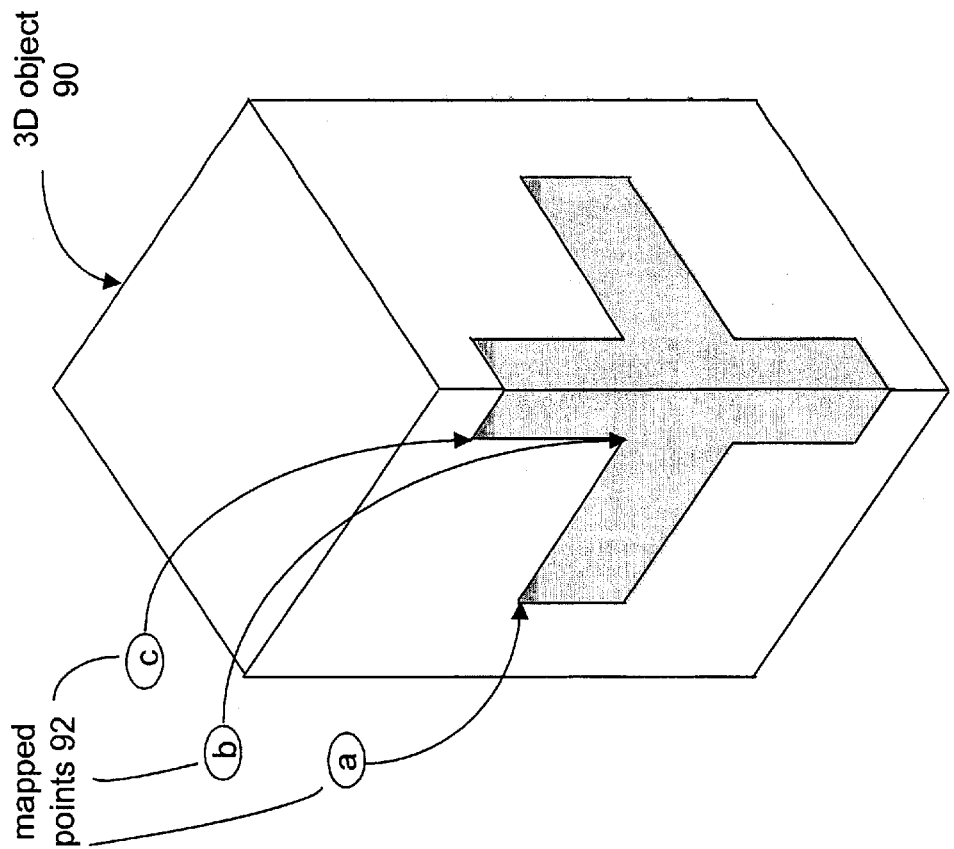
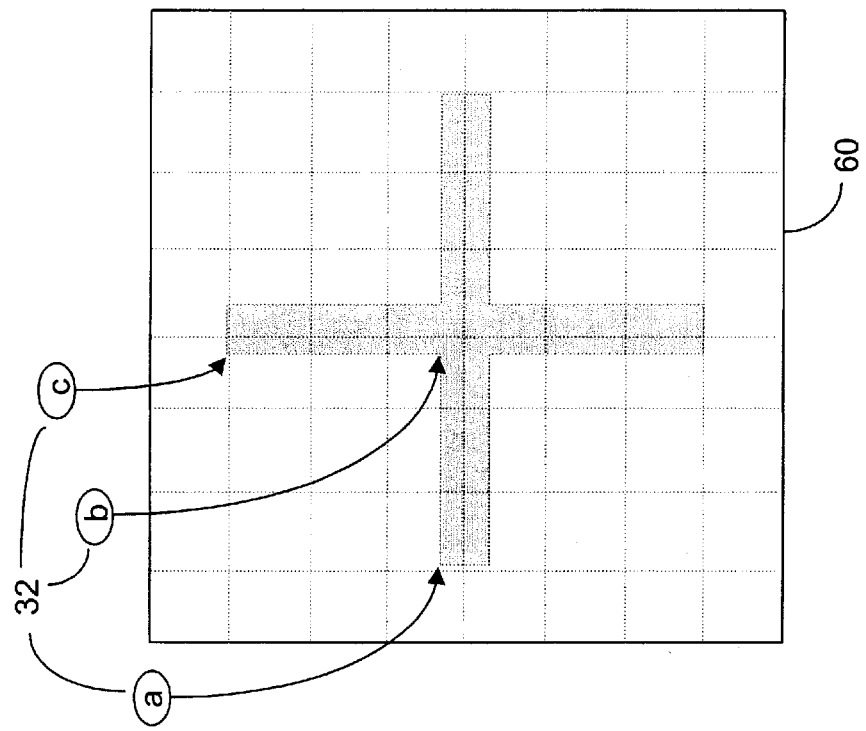
Figure 5

METHOD AND APPARATUS FOR COMPRESSION OF A TWO DIMENSIONAL VIDEO OBJECT

TECHNICAL FIELD OF THE INVENTION

This invention relates generally to video graphics processing and more particularly to three dimensional video graphics processing.

BACKGROUND OF THE INVENTION

The basic architecture of the computing device is known to include a central processing unit (CPU), system memory, input/output ports, an address generation unit (AGU), program control circuitry, interconnecting buses, audio processing circuitry, and video processing circuitry. Such computing devices are used in video game players, personal computers, work stations, and televisions, to name just a few of the almost endless number of commercial computing devices. As each of these basic elements evolve, computing devices are able to process more data and do it more quickly, offer enhanced user interfaces, and provide more vibrant displays. The more vibrant displays are the direct result of video graphics circuit evolution.

Video graphics circuits have evolved from providing simple text and two dimensional images to relatively complex three-dimensional images. Such evolution began with high-end computers, such as work stations, where the use of complex and costly circuitry is more commercially viable. For example, three-dimensional multimedia graphics started with the high-end computers using texture mapping. Texture mapping allows a rendering system to map a two dimensional image (i.e., a texture map) onto a three-dimensional shape making the three dimensional shape look more complex and realistic than the underlying geometry. While texture mapping allows a two-dimensional object to have the appearance of a complex three-dimensional image, such texture mapping requires a large amount of memory. For detailed two dimensional images, the memory required for texture mapping it on to a three dimensional object may exceed the available memory or may cause the resulting three dimensional image to exceed the actual size of the geometric scene.

To overcome the preceding problem, hardware systems include dedicated memory to support real-time texture mapping. The dedicated memory stores the two dimensional texture map making it more readily accessible. While the dedicated memory improves the efficiency of hardware systems performing texture mapping, the processing capabilities of the hardware system is limited and may soon be overtaxed by the texture mapping.

To reduce the amount of the memory required for texture mapping, the texture map maybe compressed and stored as compressed data. The compressed data, as the name suggests, requires less memory to store. With various types of compression techniques, such as vector quantization, a compression ratio of up to 35 to 1 maybe achieved with little lost in the individual quality of the rendered scene. While compression helps reduce the cost and complexity of three-dimensional texture mapping hardware circuits, a need still exists for a high-quality and economical three-dimensional graphics processor.

BRIEF DESCRIPTION OF THE DRAWINGS

FIG. 5 illustrates a graphical representation of mapping a two-dimensional image onto a three-dimensional object which is in accordance with the present invention;

DETAILED DESCRIPTION OF THE DRAWINGS

Generally, the present invention provides a method and apparatus for decompression of a two dimensional video texture map such that an object may subsequently be displayed as a three dimensional object. This is generally accomplished by a set-up engine which receives vertex parameters and generates a plurality of derivatives and Bresenham parameters, therefrom. The derivatives and Bresenham parameters are provided to an edgewalker circuit which produces, therefrom, a plurality of spans which, in turn, is converted in to a set of texel addresses by a texel address generator. A texel fetch circuit receives the set of texel addresses and uses the addresses to retrieve a set of texels, which is subsequently processed by a texel processor to produce a filtered pixel. To retrieve the set of texels, the texel fetch circuit retrieves a set of indexes based on the texel addresses and uses the set of indexes to retrieve the set of texels from a codebook. The retrieval of the set of indexes and the indexing of the codebook is executed within two consecutive clock cycles. With such a method and apparatus, a high-quality and economical three-dimensional video graphics processor is obtained.

Figure 1:
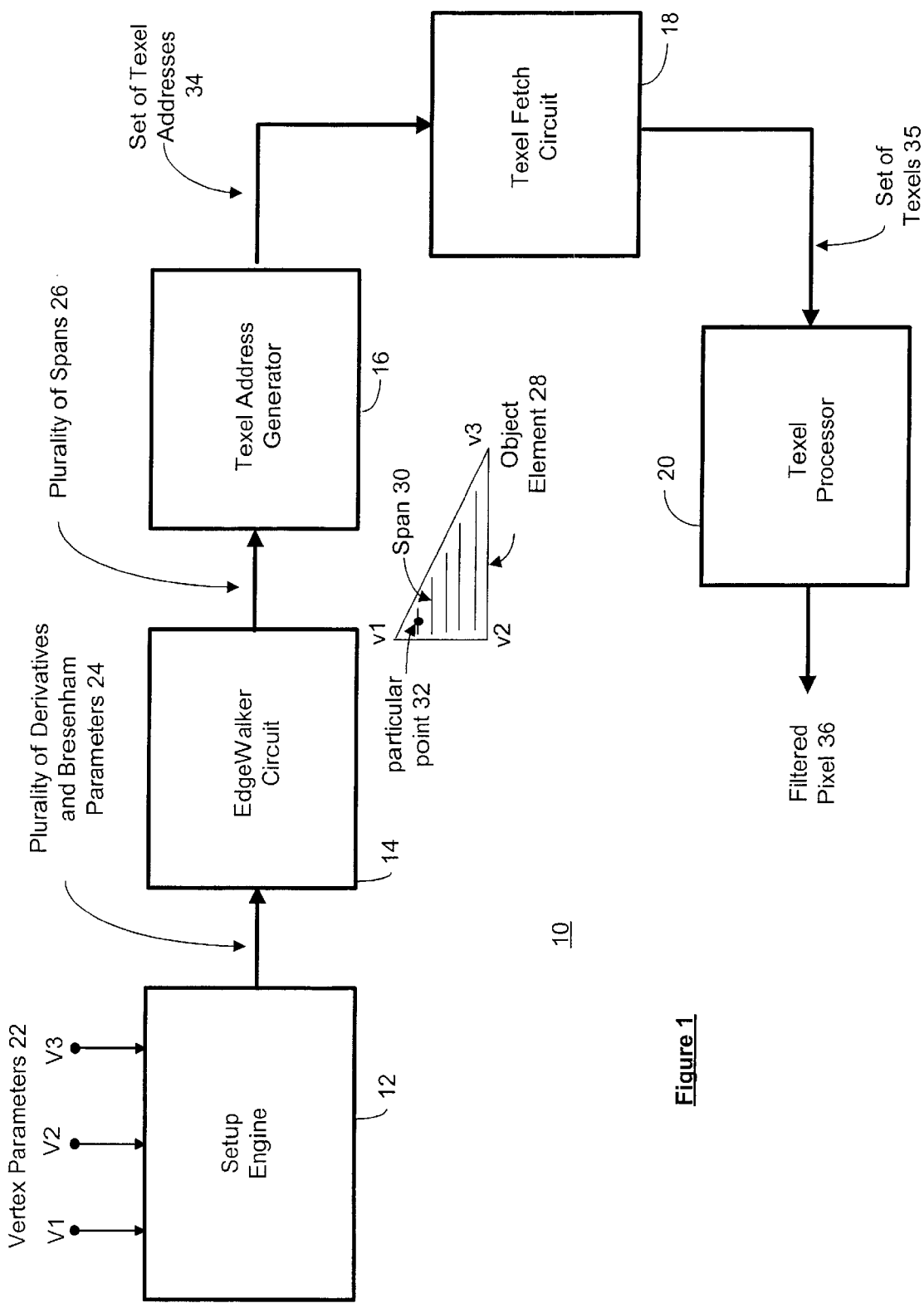
FIG. 1 illustrates a schematic block diagram of a three-dimensional graphics processor which is in accordance with the present invention.

The present invention can be more fully described with reference to FIGS. 1 through 19. FIG. 1 illustrates a schematic block diagram of a video texture decompression circuit 10 which includes a set up engine 12, an edgewalker circuit 14, a texel address generator 16, a texel fetch circuit 18, and a texel processor 20. Each of these components maybe stand-alone processing devices that include associated software, or maybe components of a single video graphics processing circuit which includes the appropriate software to perform the functionality described below. For example, each element maybe a stand-alone microprocessor, micro-controller, digital signal processor (DSP), central processing unit (CPU), a coprocessor, or any device that manipulates digital data based on operational instructions. Alternatively, the entire three-dimensional graphics processor maybe a DSP, microprocessor, micro-controller which performs the functional processes of each of the components 12, 14, 16, 18, and 20.

In operation, the set-up engine 12 receives vertex parameters 22 of an object element 28. The object element 28 is typically triangular in shape but may be of any other geometric shape that can be determined by its vertex points. The vertex parameters (V1, V2, and V3) indicate the alpha parameters, luminance and chrominance parameters, color and brightness parameters, texture mapping values, and/or three dimensional location parameters at the three vertexes (v1, v2, v3) of the object element 28. The alpha parameters indicate an object element's opaqueness, which may be opaque, transparent, or translucent. The three dimensional location parameters (x, y, z) indicate each of the vertexes three dimensional location in x, y, z coordinates; note that one of the vertexes is selected to be a starting point. The mapping parameters map particular points, (at this stage, the vertexes of the object element 28) of a two-dimensional texture map onto particular points of a three-dimensional object. The color-brightness parameters (Red, Green, Blue parameters) indicate the color and brightness for the vertex points of the object element 28.

The set-up engine 12, which may be a floating point state machine, determines a plurality of derivatives and Bresenham parameters 24 from the vertex parameters 22. The determination begins when the vertex parameters V1, V2, and V3, which represent the object element's video properties at its vertexes, are received and an x-slope and a y-slope are determined from the x and y two dimensional location parameters. Based on the slopes, the set-up engine 12 calculates the video properties of a new point within the object elements, the newly calculated video properties comprise one of the plurality of derivatives. In general, the set-up engine is a plane equation solver for each of the vertex parameters 22. As such, given the vertex parameters V1, V2, and V3, the set-up engine determines the enabling points of the object element 28 and their associated values. In addition, the color values between the enabling points of the object element 28 are linearly related based on slopes in the x and y directions. To determine this, texture slopes are established in each of the three directions based on the image to be presented. The linear relationship of the slopes in the x, y, and z directions are presented as a plurality of derivatives and Bresenham parameters 24, where the Bresenham parameter provides an integer remainder value for a given derivative as opposed to a rounded off value. As such, the Bresenharn parameter allows for more accurate representations of the derivatives since no data is lost.

As an example, assume that the object element has x, y, and y three dimensional parameters at its vertexes of V1: 1, 2, 1; at V2: 1, 1, 1; and at V3: 2, 1, 1. The slopes for this right angle triangle are: x-slope equals 1 and y-slope equals −1. Further assume that R, G, B parameters are eight bits and have the values of: R—010, G—010, B—01 at V1; R—110, G—110, B—11 at V2; and R—110, G—110, B—11 at V3. From these values, the set-up engine 12 can calculate the video properties for any point within the object element 28, which would be one of the plurality of derivatives and Bresenham parameters 24. For example, at point 1, 1.5, 1, the R, G, B parameters would be based on the changes in each direction and combined to obtain the actual derivative and Bresenham parameter. The changes in the x-direction and y-direction are 0 with respect to V1 and the change in the y-direction is 0.5 with respect to V1. As such, the R, G, B parameter at the point is R—100, G—100, and B—10.

The edgewalker circuit 14 receives the plurality of derivatives and Bresenham parameters 24 and outputs them as a plurality of spans 26. As such, the edgewalker circuit 14 begins at the starting point, which may be at v1, and figuratively walks through the object element, line by line and pixel by pixel, retrieving the derivative and Bresenham parameters for each point 32 of a span 30. The line by line and pixel by pixel stepping through the object element corresponds with the pixel resolution of a display on which the object element will subsequently be displayed. As such, the edgewalker circuit 14 maps the plurality of derivatives and Bresenham parameters 24 into a plurality of spans 26 which correspond to the pixel resolution of the display. Note that the starting point may be of subpixel precision.

The texel address generator 16 receives the plurality of spans 26 and produces, therefrom, a set of texel addresses 34 for any particular point 32. As such, for each particular point 32 in the object element 28, a different set of texel addresses 34 will be generated. As one skilled in the art will readily appreciate, even though the set of texel addresses are generated individually for each particular point 32, several points may have the same set of texel addresses. The generation of the set of texel addresses 34 will be discussed with greater detail below with reference to FIG. 3.

The texel fetch circuit 18 receives the set of texel addresses and retrieves a set of texels 35. In short, the texel fetch circuit 18 interprets the set of texel addresses 34 and retrieves a set of indexes from a first memory device. The set of indexes are then used to address a second memory device, which stores a codebook, to retrieve the set of texels 35. The codebook includes a plurality of texel codes which are compressed representations of a video textured map. Upon retrieval of the texel code(s), the texel fetch circuit 18 provides them as the set of texels 35. A more detailed discussion of the retrieval of the set of texels 35 will be discussed below with reference to FIGS. 3 and 4.

The texel processor 20 receives the set of texels 35 and generates, therefrom, a filtered pixel 36. To accomplish this, the texel processor 20, in a pipeline manner, receives sets of texels 35 and filters them to obtain the proper perspective of the filtered pixel 36 when it is displayed. The filtering may be multi-linear filtering whereby the set of texels are combined, based on the level of compression and the proper perspective, to produce the filtered pixel 36. Note that the multi-linear filtering may be bilinear filtering such that only one codebook is addressed, trilinear filtering such that two codebooks are addressed and the retrieved texel codes from each are combined to produce the filtered pixel 36, or other levels of filtering. In addition to the multi-linear filtering, the texel processor 20 may also perform blending of alpha parameters.

Figure 2:
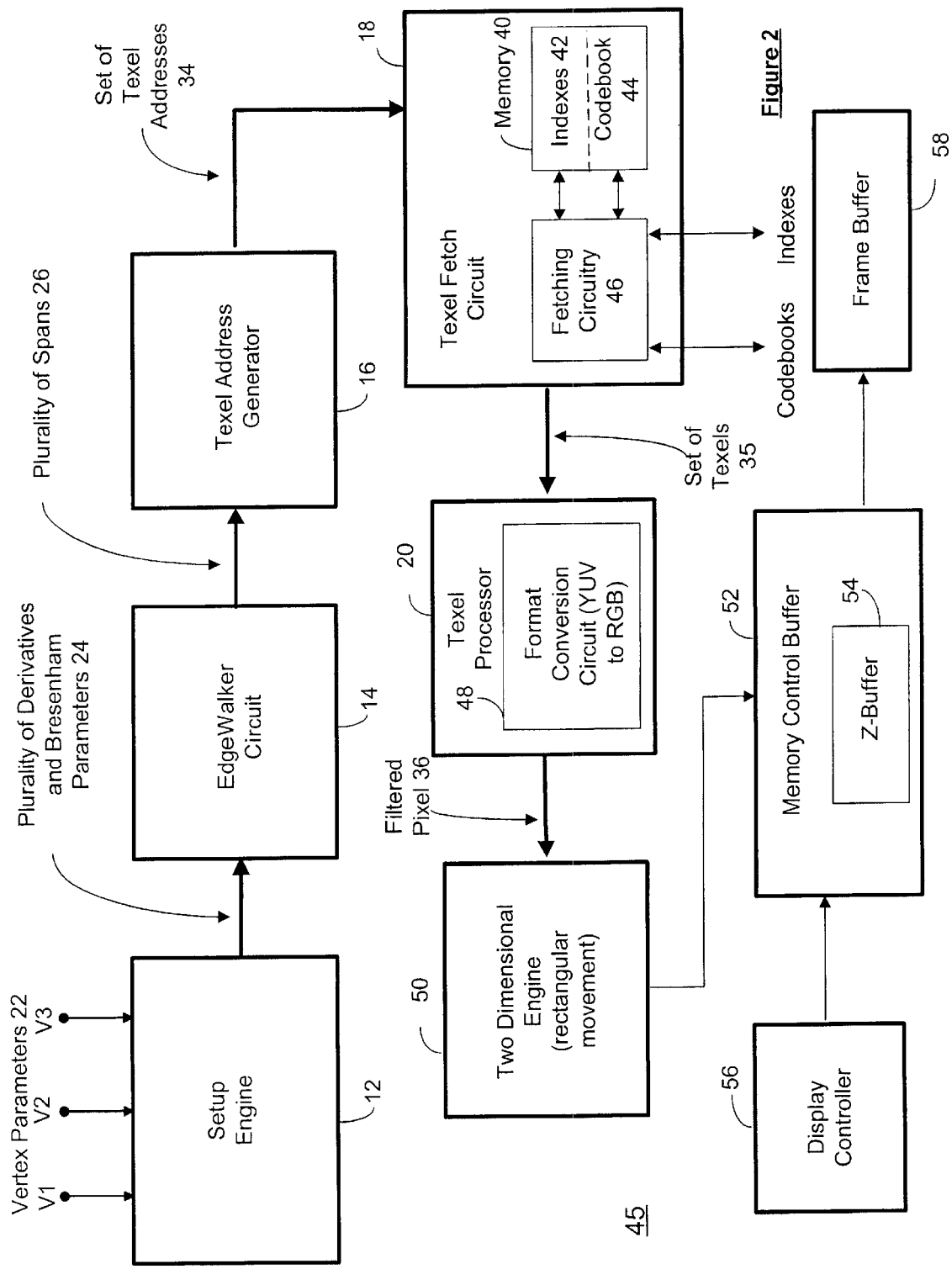
FIG. 2 illustrates a schematic block diagram of an alternate embodiment of a three-dimensional graphics processor which is in accordance with the present invention.

FIG. 2 illustrates a schematic block diagram of a further embodiment of a three-dimensional graphics processor 45. The three-dimensional graphics processor 45 includes the set-up engine 12, the edgewalker circuit 14, the texel address generator 16, the texel fetch circuit 18, the texel processor 20 and further includes a two-dimensional engine 50, a memory control buffer 52, a display controller 56, and a frame buffer 58. The operation of the set-up engine 12, the edgewalker circuit 14, and the texel address generator 16 are as previously referenced. The texel fetch circuit 18 is shown to include fetching circuitry 46 and memory 40 which has a first section which stores a plurality of indexes 42 and a second section which stores a codebook 44.

The codebook 44 is comprised of a plurality of texel codes, wherein each texel code represents a compressed version of texels of an uncompressed texture map and the video characteristics of the compressed texels. For example, the video characteristics may be R, G, B parameters, S, T, W parameters, and/or alpha-parameters. In a given application, a texel code may be 16 bits in length, such that there are approximately 64,000 possible texel codes, which forms a super set of texel codes. To be efficient, the codebook 44 needs to have considerably less than 64,000 texel codes. Typically, a codebook 44 will have 8-bit addresses for each texel code, such that the codebook 44 includes only 256 texel codes. Thus, the indexes 42 and the codebook 44 are a subset of the super set of the texel codes available. In operation, the fetching circuit 46 retrieves the indexes 42 and codebook 44 from a system memory and stores them in the memory 40, which may be a cache memory.

The texel processor 20, as previously discussed, receives the set of texels 35 and generates a filtered pixel 36 therefrom. In addition, the texel processor 20 performs texture filtering of the mapping (i.e., S, T, W) parameters of the image, performs light features, or factoring, of the R, G, B parameters, performs alpha blending, format conversion, and dithering. Texture filtering of the S, T, W parameters is a mapping of a particular point 32 of a span 30 onto a three-dimensional object. Such mapping will be discussed in greater detail with reference to FIG. 5 below. The light features, or factoring, is done by determining the particular red component, green component and blue component of the texture. Typically, the RGB value is a 24-bit code wherein there are 8 bits for red, 8 bits for green and 8 bits for blue. As such, there are 256 shades for each of red, green, and blue. Given this information, the texel processor 20 determines the appropriate R, G, B value for the filtered pixel 36.

The texel processor 20 performs alpha blending based on the opaqueness, transparency, or translucency of objects that overlap. A more detailed discussion will be presented below with reference to FIG. 10. A format conversion circuit 48, of the texel processor 20, receives luminance and chrominance parameters (i.e., Y, U, V parameters of broadcast television, video cameras, video cassette players, etc.) and converts them in to RGB parameters. Typically, Y, U, V parameters are not directly presentable on a computer screen, which utilizes RGB parameters, hence the need for the format conversion. By making such a format conversion, the format conversion circuit 48 allows television broadcasts, and the like, to be displayed on a computer monitor.

The texel processor 20 also performs dithering on the received set of texels 35. Dithering encompasses a conversion from 24-bit R, G, B parameters into lower bit count R, G, B parameters based on the parameters of the display. For example, a computer display, or monitor, may use 8 bits, 16 bits, or 24 bits for the R, G, B parameters. If the display, or monitor, uses 24 bits there is no conversion or dithering required. If, however, the computer screen, or monitor, uses 8 bits or 16 bits, the texel processor 20 must convert, or dither, the 24 bits to the appropriate 8 or 16 bit format.

In essence, dithering is done by generating an alternate pixel pattern to achieve the desired 24 bit value. For example, if a screen utilizes an 8-bit RGB parameter format, three bits are used to represent the red component, three bits are used to represent the green component, and two bits are used to represent the blue component. In this example, assume that there is no red or green contribution, i.e., both values are zero. Thus, only the blue component, which has four options, contributes to the color of the object. As previously mentioned, for a 24 bit RGB parameter, there are 8 bits for the blue component, which represents 256 shades of blue. Dithering maps the 256 shades of blue of the 24 bit RGB parameter with the four shades of blue of the 8 bit RGB parameter in a patterned manner. For example, the four shades of blue for the eight bit RGB parameter are 0-black, 1-light blue, 2-medium blue, and 3-dark blue. Corresponding shades of blue for the 24 bit RGB parameter occur when the two most significant bits of the eight bit blue component match the two bits of the blue component of the eight bit RGB parameter with all remaining bits of the eight bits of the blue component being zeros. When the correspond shade of blue is needed, the exact shade can be provided. This, however, has a probability of only 4/256, or a 1 out of 64 chance.

For a majority of the time, dithering is needed. To continue with the example, assume that the eight bit component of the 24 bit RGB parameter is 0110 0000 such that it is half way between the 1—light blue shade and the 2—medium blue shade. To obtain a more accurate representation of the 8 bit blue component of 0110 0000, a pattern of alternating between the 1—light blue shade and 2—medium blue shade may be done to obtain the equivalent of a two bit value of '1.5'. For example, by assigning an alternating pattern of 1, 2, 1, 2, 1, 2, etc. to the blue component of the 8 bit RGB parameter, the visual effect produced is a blue component of 1.5.

The two-dimensional engine 50 receives the filtered pixel 36 and provides rectangular movement of the pixel 36. In essence, the two-dimensional engine 50 takes the filtered pixel 36, which is representative of portion of a three-dimensional object, and places it onto a two-dimensional screen. In other words, the two-dimensional engine 50 prepares the filtered pixel 36 as pixel information and subsequent display on a two dimensional screen while maintaining the desired three dimensional effects.

The memory control buffer 52 receives the pixel information from the two-dimensional engine 50 and subsequently writes the pixel information to a frame buffer 58. The frame buffer 58 stores the two-dimensional pixel information for subsequent display on the computer screen. The display controller 56 controls the memory buffer such that appropriate information is stored in the frame buffer and subsequently retrieved when needed for display.

The memory control buffer 52 is shown to further include a Z buffer 54. The Z buffer 54 stores the Z parameter for each object element of each image to be displayed. The Z buffer 54 compares the Z parameters to determine which image and which object elements are in the foreground and which are in the background, with respect to each image being presented. The comparison is done by comparing a Z parameter of a new pixel with a Z parameter of an existing pixel. If the comparison determines that the Z parameter of the new pixel is the foreground with respect to the old Z parameter, the new Z parameter becomes the Z parameter to which other Z parameters will be compared. When the comparison process is complete, the remaining Z parameter indicates which object element of which image is in the foreground.

Figure 3:
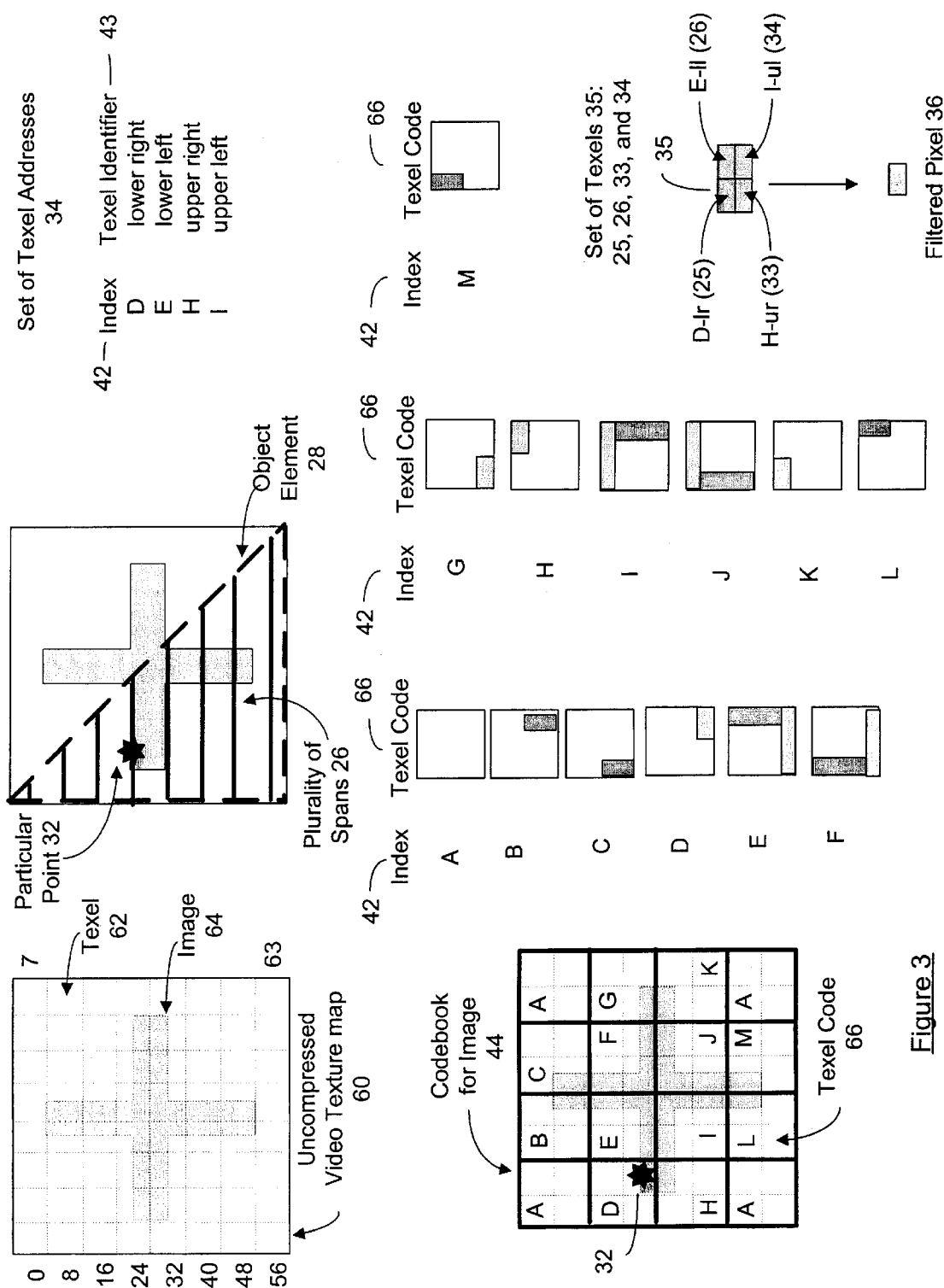
FIG. 3 illustrates a graphical representation of texture mapping which is in accordance with the present invention.

FIG. 3 illustrates a graphical representation of processing an uncompressed video texture map 60 into a three-dimensional graphics object. As shown, the uncompressed textured map includes a plurality of uncompressed texels 62. Sixty four texels are shown, with each uncompressed texel having a corresponding texel number 063. In essence, the uncompressed video texture map 60 is how the image 64 would appear on a screen if it were to be presented as a two dimensional object.

The uncompressed video texture map 60 is subsequently compressed into a plurality of texel codes 66 which comprise a codebook 44. The plurality of texel codes 66 is shown in the lower middle of FIG. 3 as the codebook 44. For this illustration, there are thirteen texel codes 66, each texel code represents a group of four texels 62 of the uncompressed video texture map 60 and has a corresponding index. As one skilled in the art will readily appreciate, a texel code may include more or less texels to provide the desired compression ratio. In this illustration, the texel codes have indexes ranging from A through M. For example, the texel code 66 with 'A' as its index 42 is the compressed representation of four sets of four uncompressed texels 62 (having texel numbers 0, 1, 8, and 9; 6, 7, 14, and 15; 48, 49, 56, and 57; and 54, 55, 62, and 63), each uncompressed texel 62 does not include a portion of the image 64. The texel code 66 having 'B' as its index 42 is the compressed representation of four uncompressed texels 62 (having texel numbers 2, 3, 10, and 11) wherein only the uncompressed texel having the texel number of 11 includes a portion of the image 64. The other texel codes 66 similarly represent four uncompressed texels and have a corresponding index as shown.

Having created the codebook with the corresponding plurality of indexes, the uncompressed video texture map 60 may be processed by the set-up engine 12 and the edge-walker circuit 14 to produce the plurality of scans 26. As shown in the mid-upper portion of FIG. 3, the image 64 has a corresponding object element 28, which has a triangular shape, that has a corresponding plurality of spans 26. In this example, a particular point 32, which lies on the image 64, is being used for illustrative purposes. To retrieve the corresponding set of texel addresses 34 for this particular point 32 the four surrounding texels are desired to be retrieved from the codebook 44. By encoding the texel addresses to include the index 42 and a texel identifier 43, which identifies whether the texel of interest is in the lower-right, lower-left, upper-right, or upper-left portion of the texel code, only the texels of interest may be retrieved. Thus, only four texels are retrieved in comparison to 16 which would be retrieved if retrieval were only based on the index, requiring additional processing to retrieve the texels of interest.

For the particular point 32, the four indexes of interest are D, E, H, and I. For index D, the texel of interest is in the lower-right; for index E, the texel of interest is in the lower-left; for index H, the texel of interest is in the upper-right; and for index I, the texel of interest is the upper-left. Given this information, the set of texels 35 can be retrieved based on the identified texel codes of the codebook 44. For this particular example, the texels of interest have numbers 25, 26, 33 and 34. The retrieved set of texels 35 (the four texels 25, 26, 33, and 34) are subsequently processed to produce the filtered pixel 36. As shown, the filtered pixel is the combination of all four texels. As one skilled in the art will readily appreciate, the filtered pixel 36 may be calculated based on any combination of the four retrieved texels.

Figure 4:
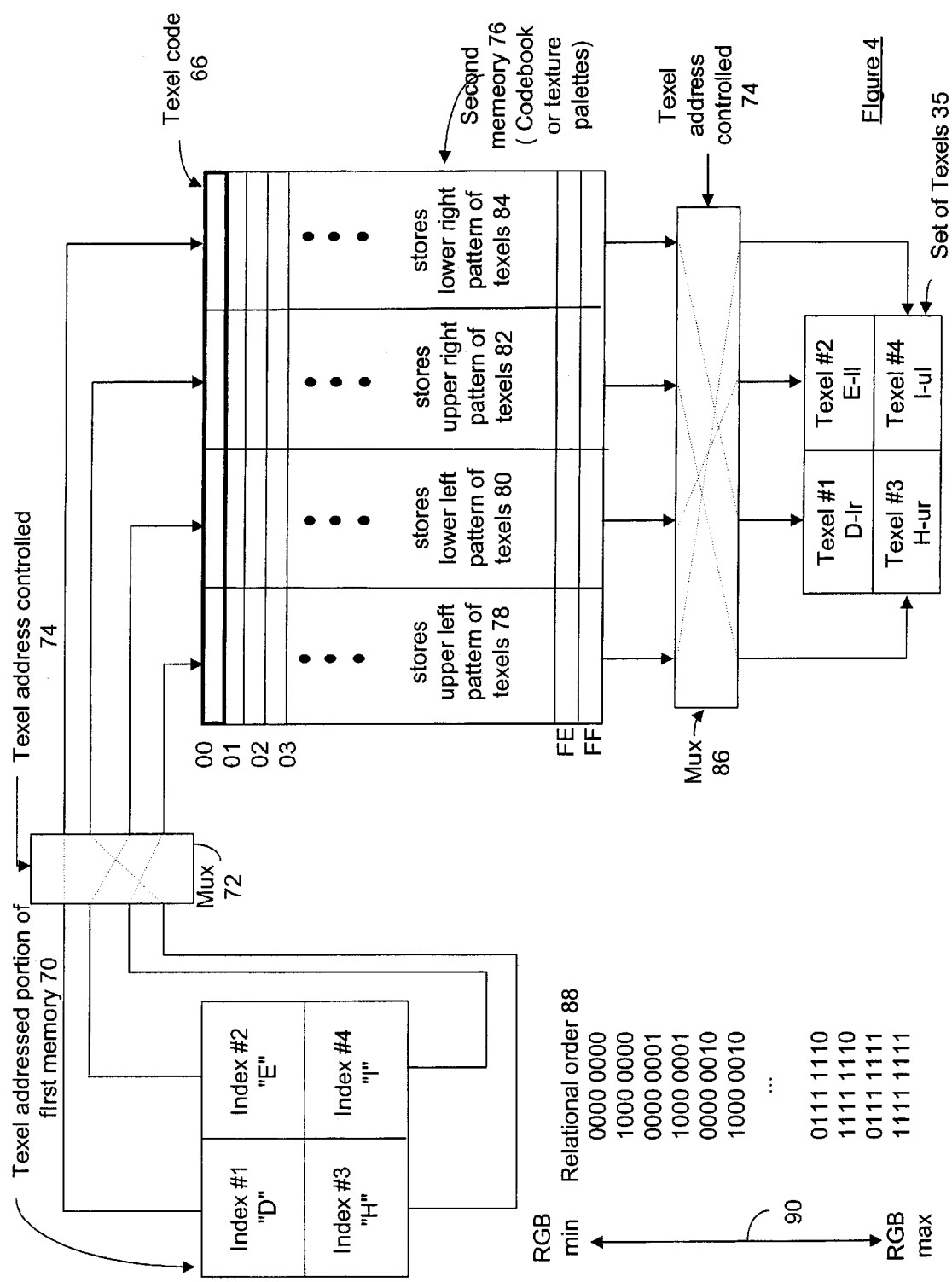
FIG. 4 illustrates a schematic block diagram of indexing the codebook which is in accordance with the present invention.

FIG. 4 illustrates a schematic block diagram of the texel fetch circuit 18. As shown, a second memory 76 of memory 40 (FIG. 2) stores a codebook 44 which may be comprised of a plurality of textured pallets. In the example shown, the codebook 44 is comprised of a plurality of texel codes 66 numbering two hundred fifty six. Each texel code 66 is a compressed representation of four texels and are stored in an addressable entry having addresses ranging from 00 (hexadecimal) to FF (hexadecimal). The codebook 44 is divided into four texture pallets, one for storing the upper-left pattern of texels 78, a second for storing lower-left pattern of texels 80, a third for storing upper-right pattern of texels 82, and a fourth for storing lower-right pattern of texels 84.

The memory 40 also includes a first memory 70, of which only a portion is shown, wherein the portion of the first memory 70 stores four indexes. The indexes shown are based on the example of FIG. 3 and are D, E, H, and I. The first memory 70 is operably coupled to the second memory through multiplexor 72. The multiplexor 72 couples the appropriate index with one of the textured pallets 78–84 to retrieve the texels of interest. The multiplexor 72 is controlled by the texel identifier 43 of the texel addresses 74. From the example of FIG. 3, the texel of interest for index D is the lower-right. As such, the multiplexor 72 is controlled by the texel identifier 43 of the texel address 74 to couple index memory location 1, which is representative of index D, to textured pallet 84. When coupled in this manner, the lower-right texel of texel code 'D" is retrieved. The multiplexor 72 is similarly controlled by the texel identifiers 43 of the texel addresses to couple the index memory location 2, which is representative of index E, to texture pallet 80; the index memory location 3, which is representative of index H, to textured pallet 82; and the index memory location 4, which is representative of index I, to textured pallet 78.

The retrieved texels from each of the texel textured pallets 78, 80, 82 and 84 are provided to multiplexor 86 which outputs the retrieved texels 1, 2, 3, and 4 based on texel address control 74. As shown, texel 1 is the texel retrieved based on index D and the lower-right texel identifier; texel 2 is the texel retrieved based on index E and the lower-left texel identifier; texel 3 is the texel retrieved based on index H and the upper-right texel identifier; and texel 4 is the texel retrieved based on index I and the upper-left texel identifier. These four texels (number 1, 2, 3 and 4) comprise the set of texels 35. The retrieval of texels in this manner allows for an efficient and economical pipeline process for three dimensional video graphics circuits. Such is the case because two dimensional video texture maps may be compressed and stored as texel codes. By retrieving only the needed texels in a parallel process, the number of operational steps are reduced since only four texels are retrieved and not sixteen. The retrieval may be done in a parallel manner, further reducing the retrieval time.

FIG. 4 further illustrates a relational order 88 of the addresses for the second memory 76, i.e., for the codebook 44. These addresses are shown in binary format. For the purposes of this illustration assume the only information contained within a texel code is for RGB parameters 90. The RGB parameter 90 ranges from a minimum value to a maximum value, where the minimum RGB value is stored at address 0000 0000; the second minimum RGB value is stored at address 1000 0000; the third minimum RGB value is stored at address 0000 0001; the fourth minimum RGB value is stored at address 1000 0001, etc. As can be seen, a pattern is developed by toggling the most significant bit of the address for each successive RGB value. As one skilled in the art will readily appreciate, the relational order 88 may be obtained by toggling the least significant bit, and/or multiple least or most significant bits.

By storing the RGB values in a relational order 88, a portion of the second memory may become unavailable due to other processing needs, and the resolution of the codebook would be reduce by a factor of two (assuming half of the second memory was lost to other processing needs), but would allow the retrieval of texel codes as previously discussed. By dropping the most significant bit, the first and second and minimum RGB values default to the first minimum RGB value or the second minimum RGB value. Similarly, the third and fourth minimum RGB values would default to using the third minimum RGB value or the fourth minimum RGB value. As such, the relational order changes the codebook from 256 possible values to 128 possible values with minimal effects on the overall operation of the video graphics circuit 10.

FIG. 5 illustrates a schematic representation of a video texture map 60 being mapped onto a three-dimensional object 90. As shown, the video texture map 60 has an image of a plus sign wherein three particular points 32, referenced A, B and C, are shown. The points are subsequently mapped onto the three-dimensional object as mapped points 92 with corresponding locations A, B and C. As shown, the mapping of the two-dimensional video texture map 60 onto the three-dimensional object 90 is accomplished by retrieving, from the codebook, the texels, which are filtered into filtered pixels 36, and mapping them on the three-dimensional object. As further shown, the three-dimensional object is in a particular orientation to the viewing screen. If, however, the three-dimensional object were rotated such that the image was to be presented from a perspective view, i.e., the three-dimensional object tilts towards the viewer, the filtered pixel 36 would correspondingly present the perspective angle such that the three dimensional affects are maintained.

Figure 6:
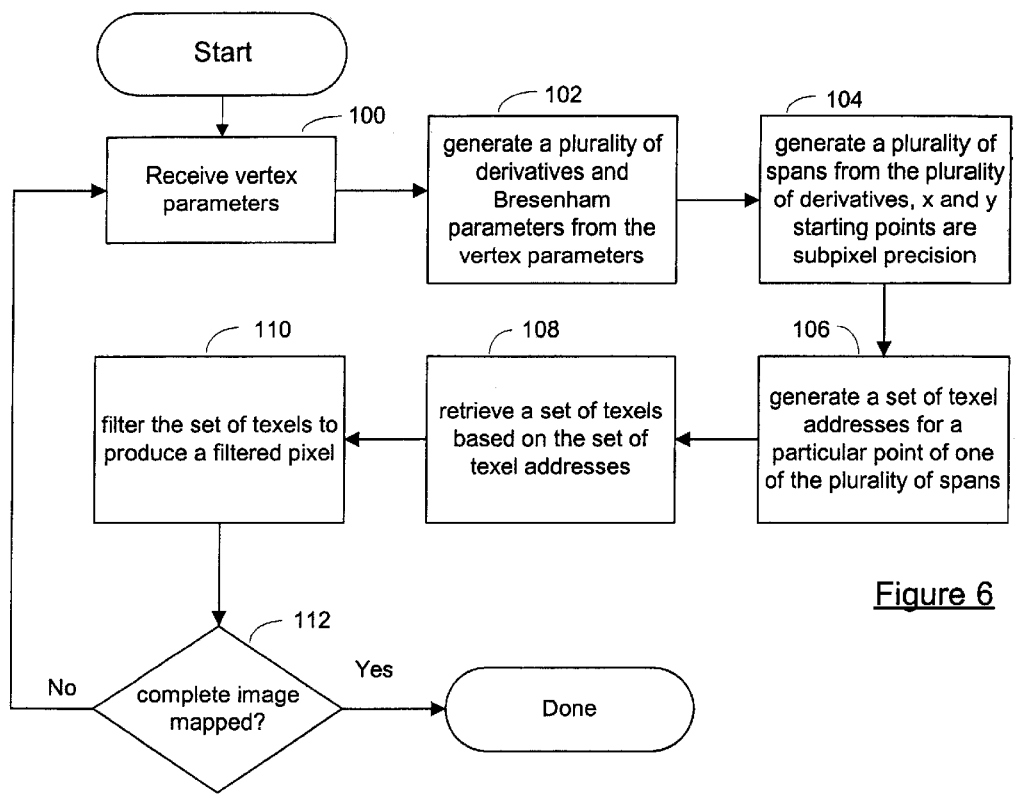
FIG. 6 illustrates a logic diagram for three-dimensional graphics processing in accordance with the present invention.

FIG. 6 illustrates a logic diagram that may be used to process three-dimensional graphical images by the video processing circuit 10. The process begins at step 100 where vertex parameters are received. As previously mentioned, vertex parameters include alpha-parameters, three-dimensional location parameters (xyz), mapping parameters (STW), and color brightness parameters (RGB). The process then proceeds to step 102 where a plurality of derivatives and Bresenham parameters are generated from the vertex parameters. Having generated the plurality of derivatives and the Bresenham parameters, the process proceeds to step 104 wherein a plurality of spans are generated from the plurality of derivatives and Bresenham parameters. Note that the x and y starting point of the spans may be of subpixel precision.

The process then proceeds to step 108 where a set of texel addresses are generated for a particular point of one of the plurality of spans. Note that step 106 is repeated for each particular point of each of the plurality of spans such that the entire object element has been mapped. For each of the set of texel addresses generated, the process proceeds to step 108 where a set of texels is retrieved based on the set of texel addresses. Having retrieved the set of texels, the process proceeds to step 110 where the set of texels are filtered to produced a filtered pixel. Next, the process proceeds to step 112 where a determination is made as to whether the entire image has been mapped into filtered pixels. If not, the process returns to step 100. If, however, the image has been completely mapped, the process is complete.

Figure 7:
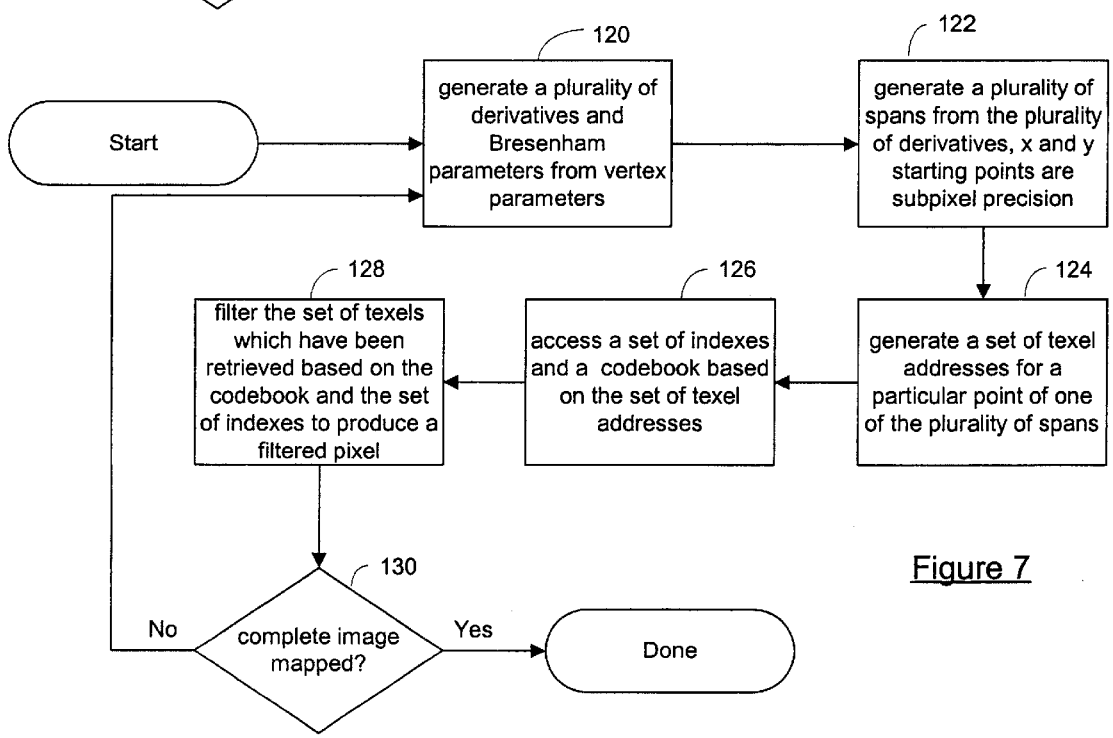
FIG. 7 illustrates a logic diagram for an alternate three-dimensional graphics processing method which is in accordance with the present invention.

FIG. 7 illustrates a logic diagram that may be used to implement an alternate three-dimensional video graphics processing method by the video graphics circuit 10. The process begins at step 120 where a plurality of derivatives and Bresenham parameters are generated from vertex parameters. The process proceeds to step 122 where a plurality of spans are generated from the plurality of derivatives and Bresenham parameters. The plurality of spans include an x and y starting point which is of sub-pixel precision. The process then proceeds to step 124 where a set of texel addresses are generated for a particular point of one of the plurality of spans. The process then proceeds to step 126 where a set of indexes and a codebook are addressed based on the set of texel addresses.

The codebook, which stores a plurality of texel codes, is addressed based on the index and a texel identifier, to retrieve only the texels needed, i.e., the set of texels. At this point, the process proceeds to step 128 where the set of texels are filtered to produce a filtered pixel. The process then proceeds to step 130 where a determination is made as whether the complete image has been mapped. If not, steps 120 through 128 are repeated for a new particular point for one of the spans. Once all of the particular points of all of the plurality of spans have had a set of texels retrieved therefor and corresponding filtered pixels generated therefrom, the process is complete.

Figure 8:
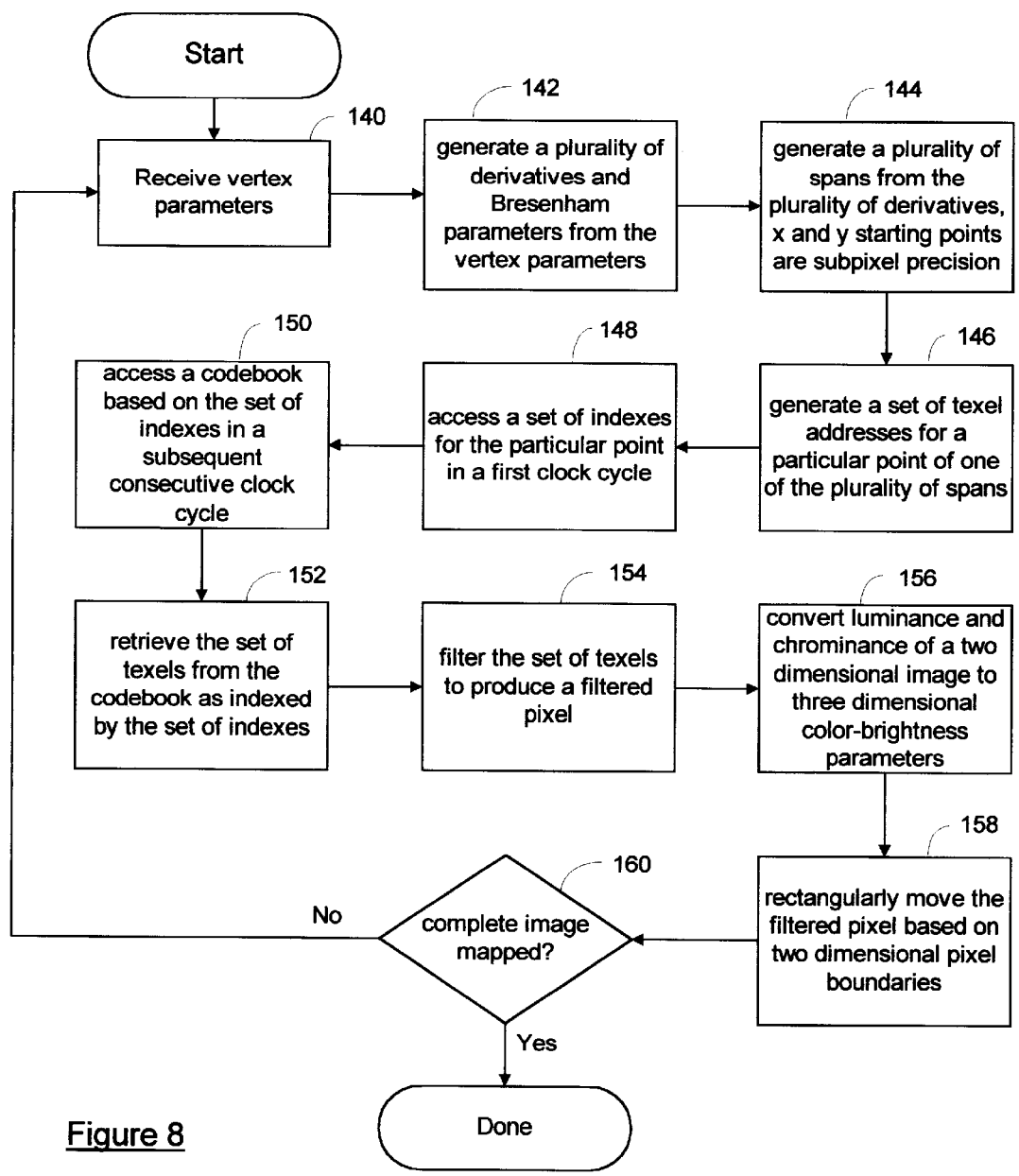
FIG. 8 illustrates a logic diagram representing another three-dimensional graphics processing method which is in accordance with the present invention.

FIG. 8 illustrates a logic diagram which may be used to implement yet another process for processing three-dimensional graphics by the video graphics circuit 10. The processes begins at step 140 where vertex parameters are received. The process then proceeds to step 142 where a plurality of derivatives and Bresenham parameters are generated from the vertex parameters. Having done this, the process proceeds to step 144 where a plurality of spans are generated from the plurality of derivatives and Bresenham parameters, wherein the x and y starting points are of sub-pixel precision. The process then proceeds to step 146 where a set of texel addresses are generated for a particular point of one of the plurality of spans. With the set of texel addresses generated, the process proceeds to step 148, where a set of indexes are accessed for the particular point based on the set of texel addresses in a first clock cycle.

The process then proceeds to step 150 where a codebook is accessed based on the set of indexes in a subsequent consecutive clock cycle. By accessing the set of indexes in a first clock cycle and the codebook in a subsequent consecutive clock cycle, the retrieval of a set of texels can be done within two clock cycles. Thus, making an efficient and economical method for utilizing video compression and decompression without the processing delays or cost of previous three dimensional video graphics circuits. The process then proceeds to step 152 where a set of texels is retrieved from the codebook as indexed by the set of indexes. The process continues at step 154 where the set of texels are filtered to produce a filtered pixel. By retrieving the set of indexes, as opposed to retrieving a single address, the retrieved texels can be filtered to produce the filtered pixel. Such a process is referred to as bilinear filtering. As an alternative to bilinear filtering, the video graphics circuit may perform multi-linear filtering to produce the filtered pixel. Multi-linear filtering is done by indexing a plurality of codebooks, each codebook includes a plurality of texel codes that represent a different compression level. The sets of texels retrieved from the codebooks are combined to produce the filtered pixel.

The process continues at step 156 where luminance and chromance values of a two-dimensional image, such as television broadcasts, or the like, are converted to three-dimensional color and brightness parameters. This step, of course, assumes that television broadcast video, or the like, is to be displayed. If not, the step is skipped. The process continues to step 158 where the filtered pixels are rectangularly moved based on two-dimensional pixel boundaries. In essence, the three-dimensional image is being manipulated to be displayed on a two-dimensional screen. At this point, the process proceeds to step 160 where the determination is made as to whether the image has been completely mapped. If not, the process repeats at step 140. If, however, the image has been completely mapped the process is done.

Figure 9:
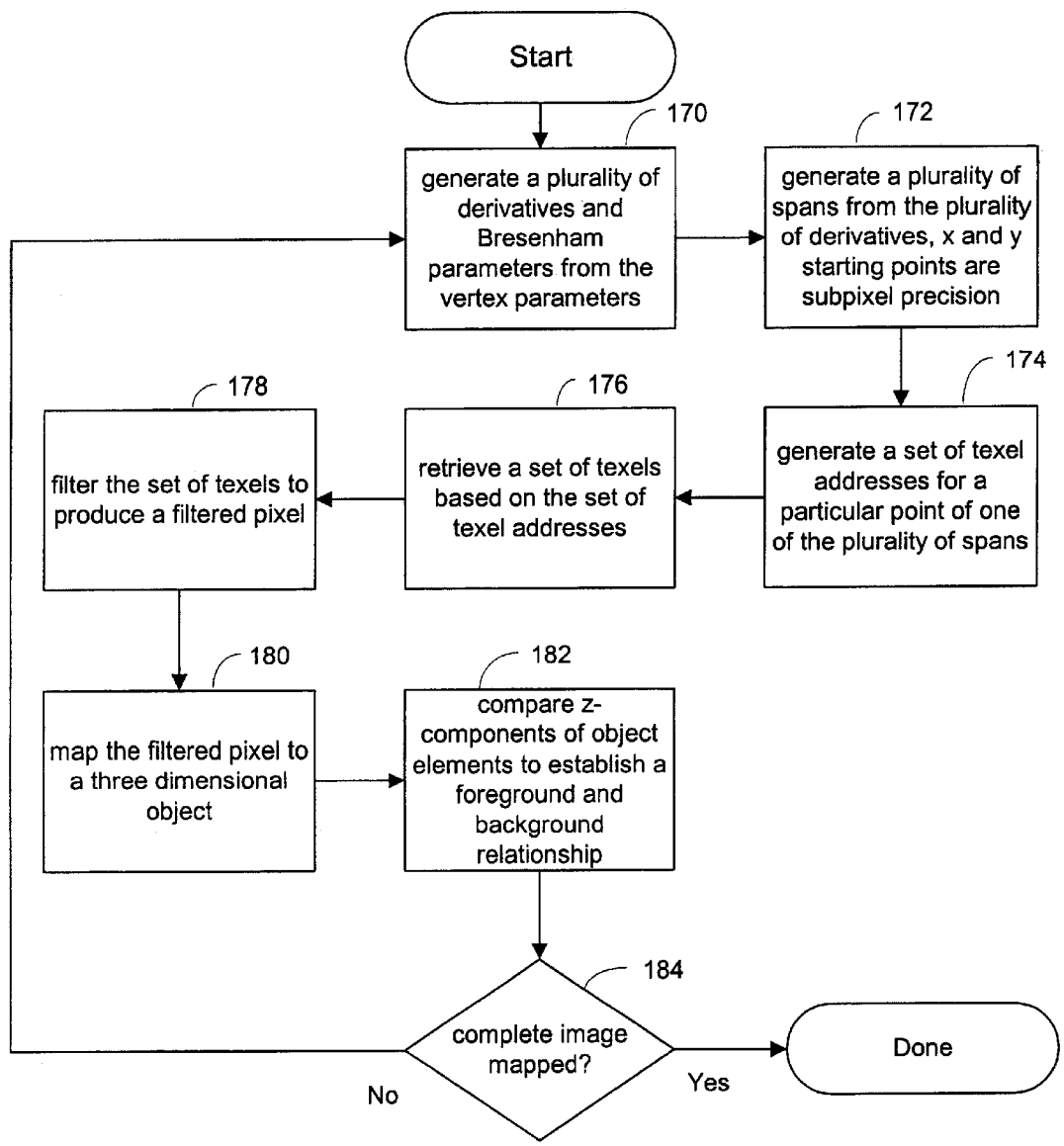
FIG. 9 illustrates a logic diagram of yet another three-dimensional graphics processing method which is in accordance with the present invention.

FIG. 9 illustrates a logic diagram of yet another method for implementing three-dimensional graphic processing by the video graphics circuit 10. The process begins at step 170 where a plurality of derivatives and Bresenham parameters are generated from vertex parameters. The process then proceeds to step 172 where a plurality of spans are generated from the plurality of derivatives and Bresenham parameters, wherein the x and y starting points are of sub-pixel precision. The process then proceeds to step 174 where a set of texel addresses are generated for a particular point of one of the plurality of spans. Having done this, the process proceeds to step 176 where a set of texels are retrieved based on the set of texel addresses. The set of texels are then filtered to produce a filtered pixel at step 178.

The process continues at step 180 where the filtered pixel is ready to be mapped on to a three-dimensional object. A discussion of this has been previously presented with reference to FIG. 5. The process then proceeds to step 182 where a comparison of the z-components of object elements is done to establish a foreground and background relationship. The z comparison process compares the z-component of each object element to determine which object element is in the foreground with respect to the other object elements and which are in the background. The process then proceeds to step 184 where a determination is made as to whether the image has been completely mapped. If not, the process continues at step 170. If, however, the image has been completely mapped, the process is done.

Figure 10:
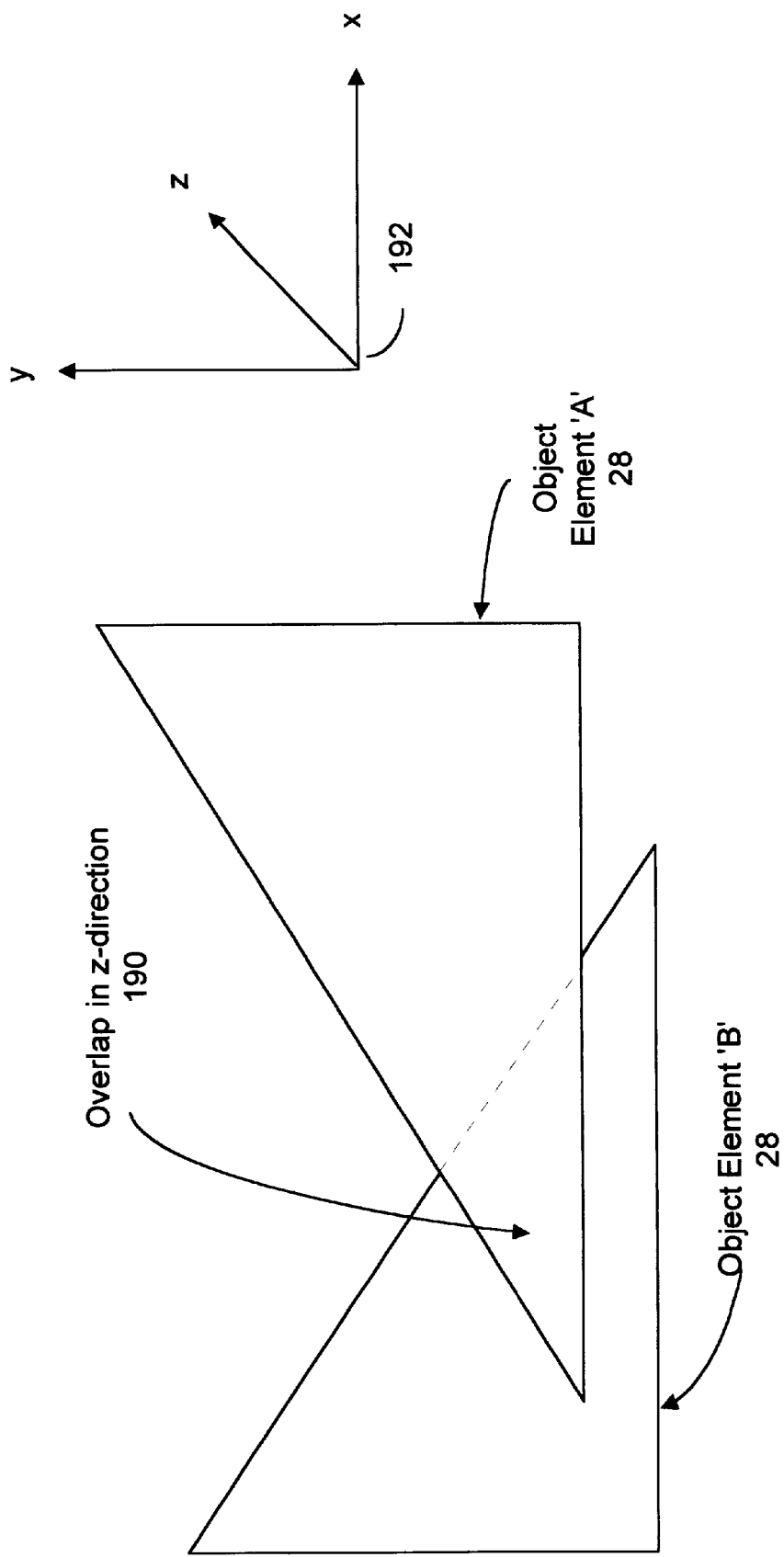
FIG. 10 illustrates the rendering of object elements that overlap in the Z direction, such rendering is done in accordance with the present invention.

FIG. 10 illustrates a graphical representation of two object elements 28 having a overlap 190 in the Z direction. The XYZ coordinates 192 have the orientation with respect to the object elements as shown. Thus, with the XYZ coordinates as shown, the overlap in the Z direction is in towards the paper. The overlap as shown, has object element 'A' in the foreground with respect to object element 'B'. The Z buffer, as previously mentioned, stores the Z component for each particular point in the object elements 28 and performs the comparison to determine that object element 'A' is in the foreground. Thus, when the object elements 28 are displayed, object element A will be in the foreground with object element B in the background.

Alpha filtering, or blending of object elements 'A' and 'B' will depend on the alpha-parameters of object element 'A'.

If, the alpha-parameter of object element 'A' in the overlap area is opaque, the overlapped portion of object element 'B' will be completely blocked out by object element 'A'. If, however, the alpha-parameter of object element 'A' in the overlap area is transparent or translucent, the portion of object element 'B' in the overlapped area will be blended with the portion of object element 'A' in the overlapped area. The alpha-blended object elements will subsequently be displayed as blended object elements.

Figure 11:
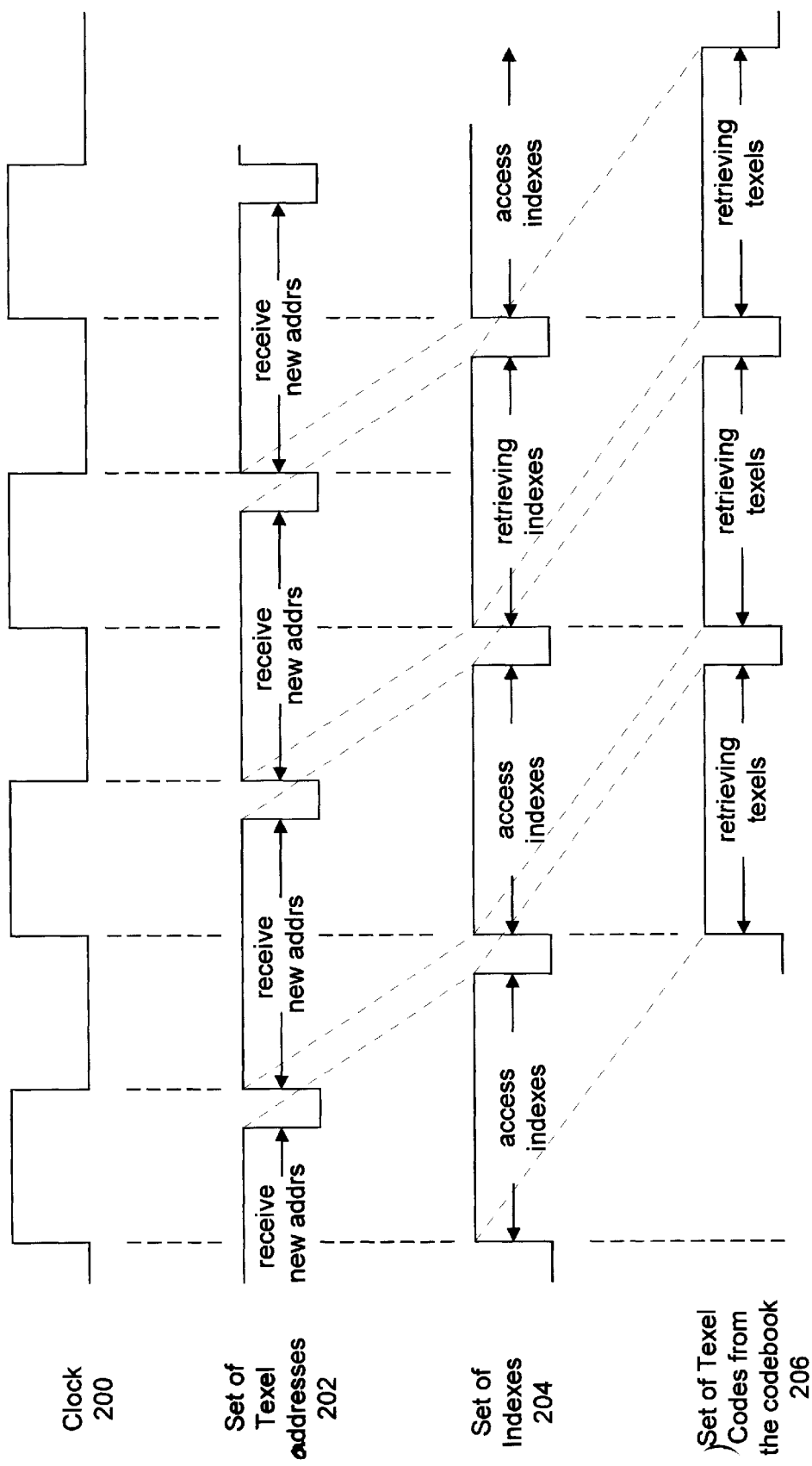
FIG. 11 illustrates a timing diagram of three-dimensional graphics processing in accordance with the present invention.

FIG. 11 illustrates a timing diagram for retrieving a set of texel codes from a codebook as used by the video graphics circuit 10. As shown, the clock cycle 200 has a 50% duty cycle wherein the frequency may be in the range of tens of megahertz to hundreds of megahertz. On the trailing edge of the clock cycle 200, the set of texel addresses 202 are received by the texel fetch circuit from the texel address generator. On the subsequent leading edge of the clock cycle 200, the set of indexes are accessed in a first cash memory of the texel fetch circuit. At the leading edge of the subsequent clock cycle, the set of texel codes are retrieved from the codebook 206, which are stored in a second cache memory of the texel fetch circuit. Thus, a pipeline is formed wherein a set of texels are retrieved with every clock cycle based on the retrieval of a set of indexes 204 and texel codes in each consecutive clock cycle.

Figure 12:
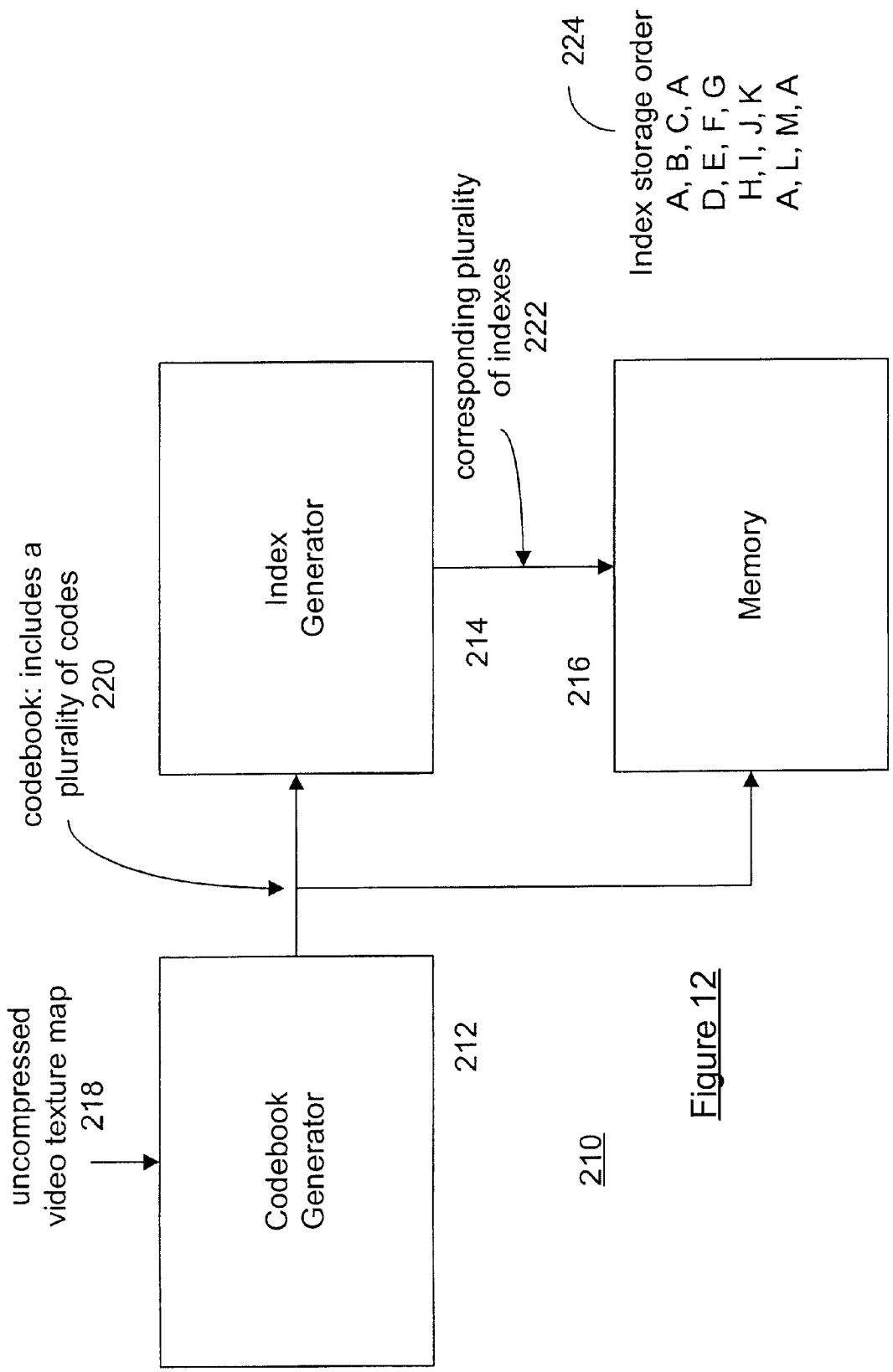
FIG. 12 illustrates a schematic block diagram of video texture compression circuitry which is in accordance with the present invention.

FIG. 12 illustrates a schematic block diagram of a video texture compression circuit 210. The video texture compression circuit 210 includes a codebook generator 212, an index generator 214, and memory 216. In operation, the codebook generator 212 which may be a microprocessor, microcontroller, digital signal processor, or any other processing device that manipulates digital data based on programming instructions, receives an uncompressed video texture map 218. The uncompressed video texture map is then compressed into a codebook that includes a plurality of texel codes 220. As previously mentioned, the codebook selects the plurality of texel codes from a vast member of codes, i.e., a super-set of texel codes. For example, for a 16 bit code word, there are approximately 64,000 texel codes available. If, the codebook is compressing the data into an 8 bit code word, the maximum length of the codebook is 256 texel codes.

The index generator 214, which may be a microprocessor, micro-controller, digital signal processor, or any other processing device that manipulates digital data based on programming instructions, corresponds an index with one of the plurality of texel codes of the codebook. The index generator 214 provides a corresponding plurality of indexes 222 to the memory 216. The memory stores the codebook and the corresponding plurality of indexes 222 in an index storage order 224. For example, the index storage order 224 for the uncompressed video texture map 60 of FIG. 3 is A, B, C, A, B, E, F, G, H, I, J, K, A, L, M, and A. With such a storage order 224, the uncompressed video texture map 218 is now represented by the corresponding plurality of indexes and the codebook which require considerably less storage space than the uncompressed video texture map.

Figure 13:
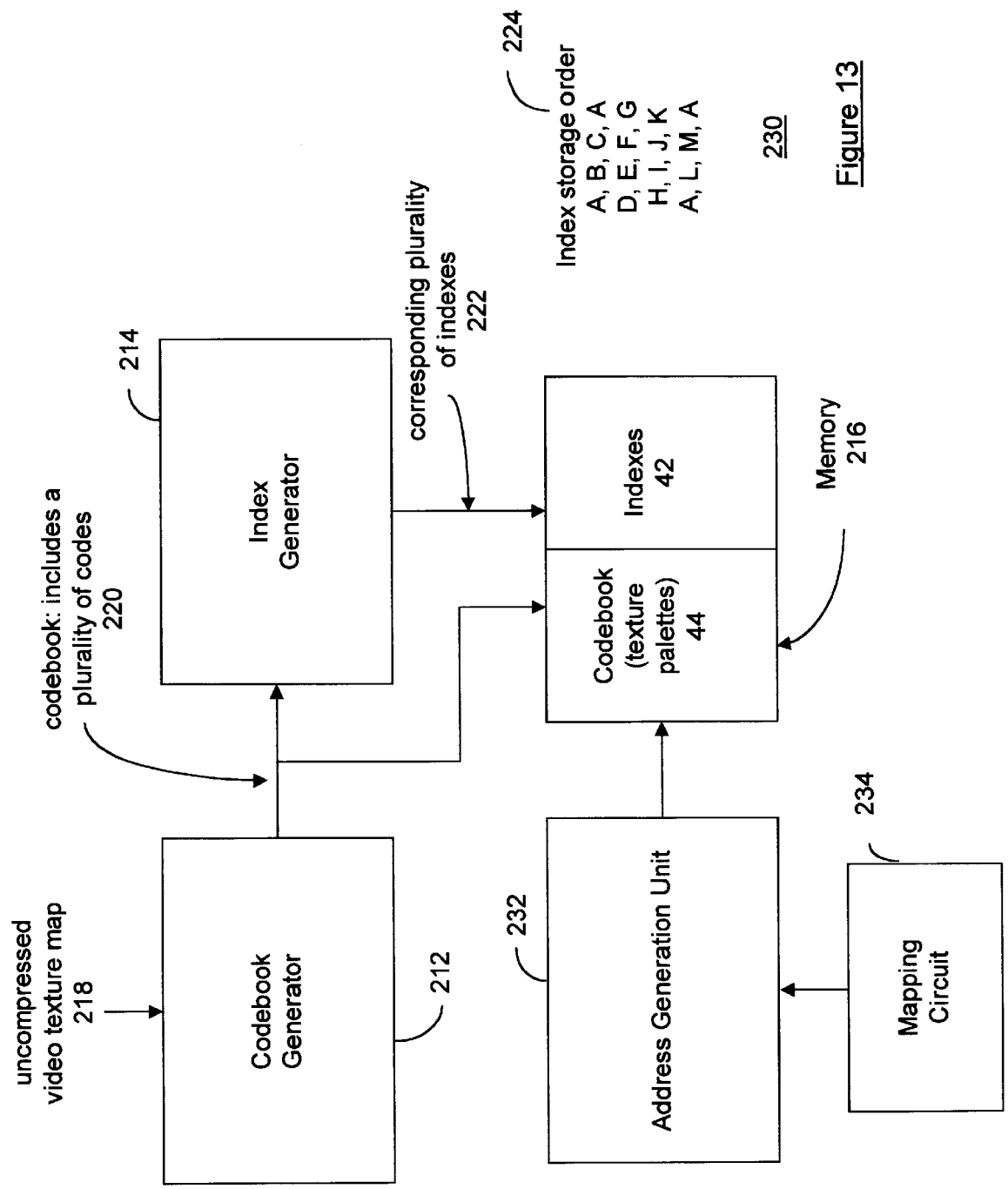
FIG. 13 illustrates an alternate embodiment of a video compression circuit which is in accordance with the present invention.

FIG. 13 illustrates a schematic block diagram of an alternate video texture compression circuit 230. The video compression circuit 230 includes the codebook generator 212, the index generator 214, the memory 216 and further includes an address generation unit 232 and a mapping circuit 234. The memory 216 is shown to have a first memory section for storing the corresponding plurality of indexes 42 and a second memory section for storing the codebook 44, which may be a plurality of texture pallets. The address generation unit 232 is operably coupled to the memory 216 for retrieving the particular set of texels based on incoming information. The incoming information is provided by the mapping circuit 234 for a particular point of one of the plurality of spans. As previously mentioned, the particular point varies as the object element is mapped on to a three-dimensional image.

Figure 14:
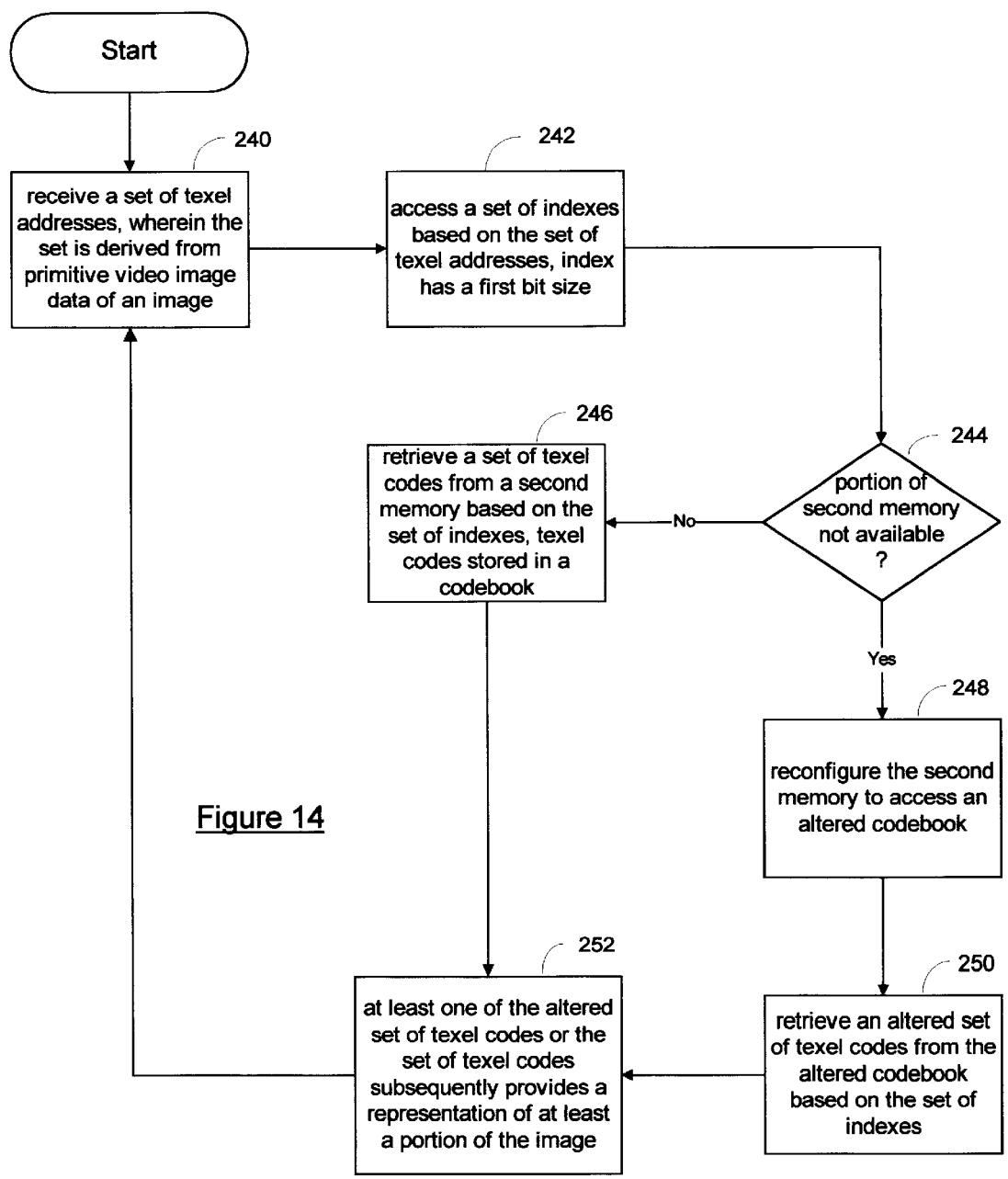
FIG. 14 illustrates a logic diagram which maybe used to implement a texel retrieval process which is in accordance with the present invention.

FIG. 14 illustrates a logic diagram that may be used to decompress video textures by the video graphics circuit 10. The process begins at step 240 where a set of texel addresses are received. The set of texel addresses are derived from primitive video image data of a particular image. The primitive video image data may be uncompressed texels of the particular image. The process then proceeds to step 242 where a set of indexes are accessed based on the set of texel addresses. Each index has a first bit-size which may be in the range of four bits to sixteen bits.

The process then proceeds to step 244 where a determination is made as to whether a portion of the second memory is not available. As previously discussed, the second memory stores the codebook which includes the plurality of texel codes. If the second memory is completely available, the process proceeds to step 246 where a set of texel codes are retrieved from the second memory based on the set of indexes. The process then proceeds to step 252 which will be discussed subsequently.

If, however, a portion of the second memory is not available, the process proceeds to step 248 where the second memory is reconfigured to access an alternate codebook. The alternate codebook is a subset of the codebook which is used when the second memory is completely available. By storing the texel codes in the codebook in a relational order, the altered codebook can be retrieved by ignoring the most significant bit of the addresses for the texel codes, ignoring the least significant bit for the addresses of the texel codes, or a combination thereof The process then proceeds to step 250 where an altered set of texel codes are retrieved from the altered codebook based on the set of indexes. The relationship between the codebook and the altered codebook was previously discussed with reference to FIG. 4. The process then proceeds to step 252 where at least one of the altered set of texel codes or the set of texel codes subsequently provides a representation of at least a portion of the image as a filtered pixel. As previously discussed, for each particular point of a span, the process needs to repeat each step until the entire image has been processed before a complete representation of the image would be available.

Figure 15:
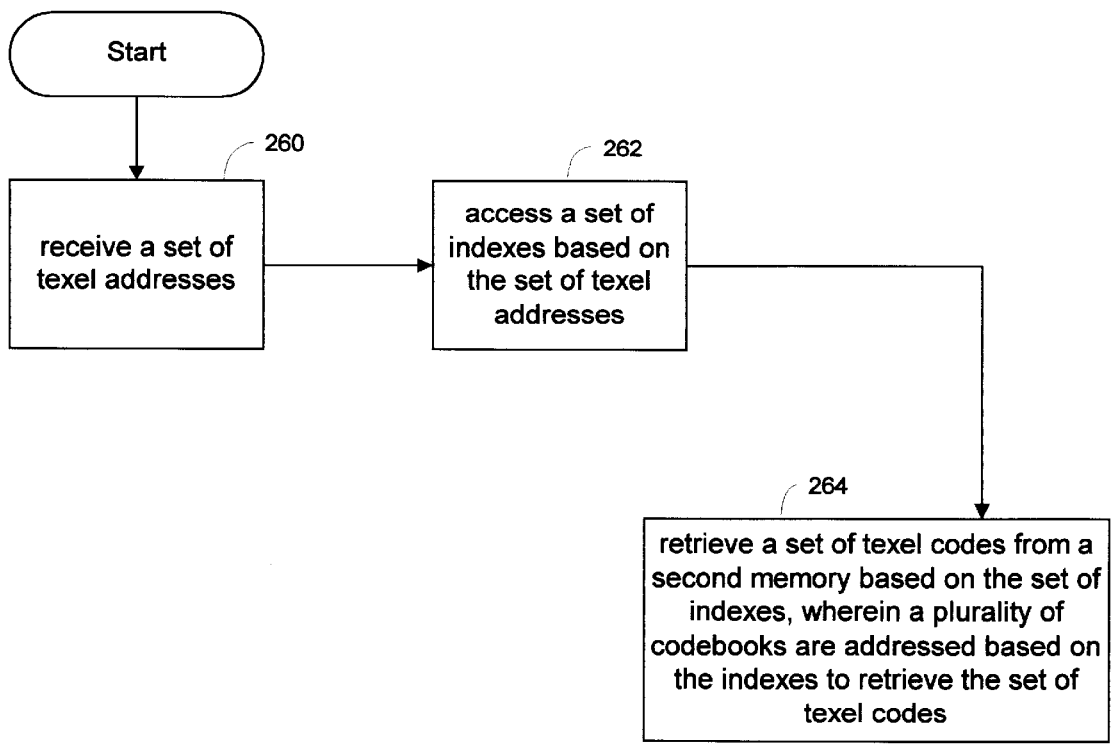
FIG. 15 illustrates a logic diagram which maybe used to implement an alternate texel retrieval process which is in accordance with the present invention.

FIG. 15 illustrates a logic diagram that may be used to implement an alternate method for video texture decompression by the video graphics circuit 10. The process begins at step 260 where a set of texel addresses are received. The process then proceeds to step 262 where a set of indexes are accessed from a first memory based on the set of texel addresses. The process then proceeds to step 264 where a set of texel codes are retrieved from a second memory based on the set of indexes. The second memory stores a codebook which includes a plurality of texel codes, wherein the set of texel codes are indexed ones of the plurality of texel codes.

Figure 16:
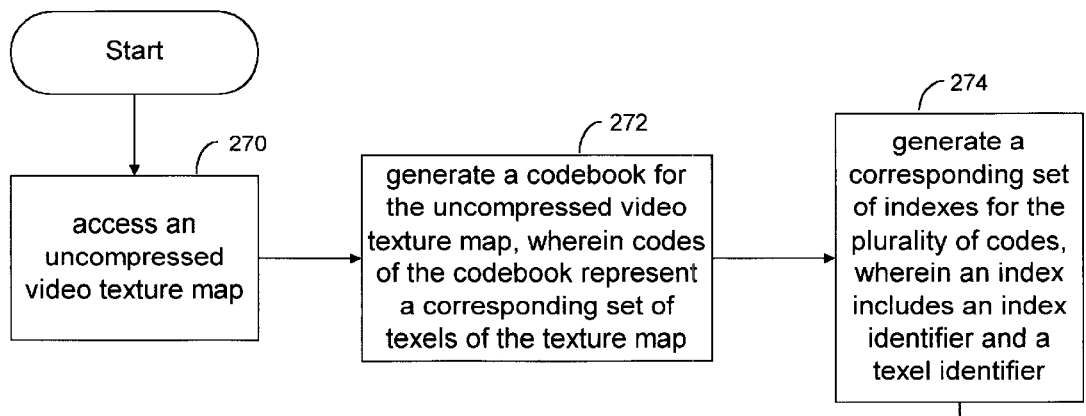
FIG. 16 illustrates a logic diagram which maybe used to generate a compression codebook in accordance with the present invention.

FIG. 16 illustrates a logic diagram that may be used to perform video texture compression by the video graphics circuit 10. The process begins at step 270 where an uncompressed video texture map is accessed. The process then proceeds to step 272 where a codebook is generated for the uncompressed video texture map. The codebook includes a plurality of texel codes, wherein each texel code represents a compressed representation of a corresponding set of texels of the uncompressed video texture map. The process then proceeds to step 274 where a corresponding set of indexes are generated for each of the texel codes in the codebook. Each of the indexes includes an index identifier which identifies the texel code. The process then proceeds to step 276 where the indexes are stored in an order corresponding to the uncompressed video map to produce a compressed textured map.

Figure 17:
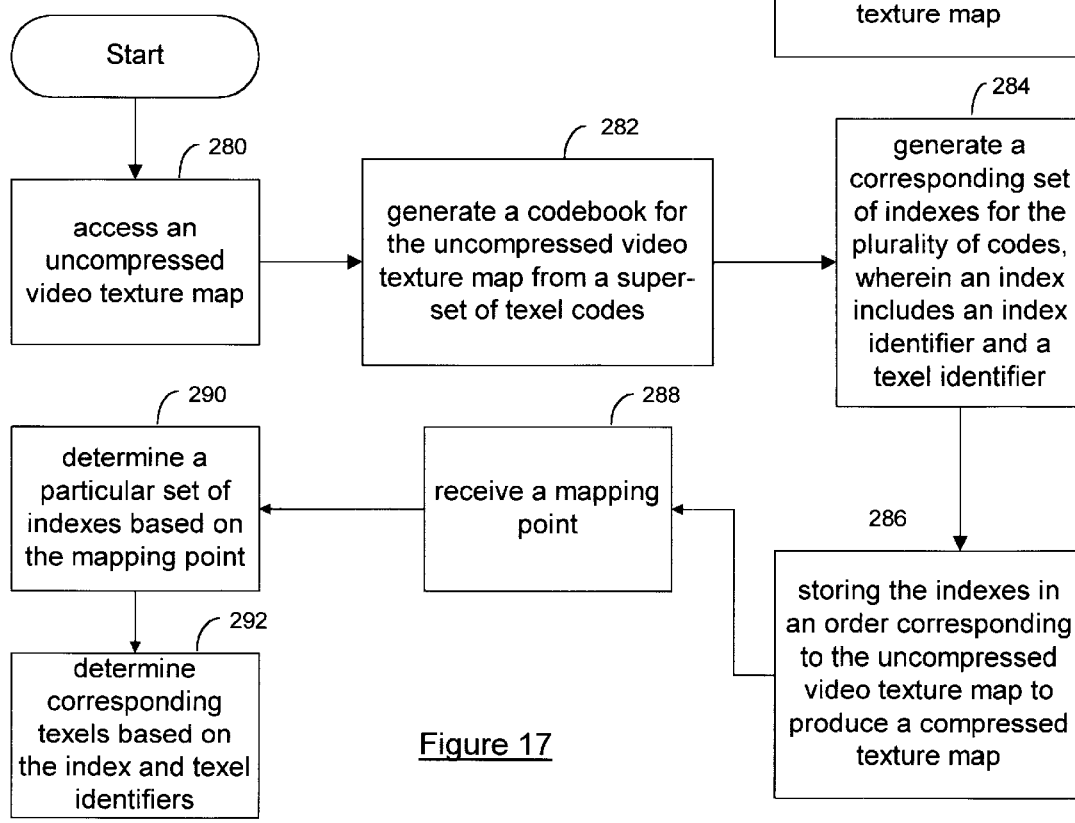
FIG. 17 illustrates a logic diagram which illustrates an alternate method for generating a codebook in accordance with the present invention.

FIG. 17 illustrates a logic diagram that may be used to implement an alternate method for video texture compression by the video graphics circuit 10. The process begins at step 280 where an uncompressed video texture map is accessed. The process then proceeds to step 282 where a codebook for the uncompressed video texture map is generated from a super set of texel codes. As previously mentioned, a texel code may be a 16 bit word but may vary in length from 8 bits to 64 bits. For a 16 bit texel code, there are approximately 64,000 possible texel codes which comprise the super set of texel codes.

The process then proceeds to step 284 where a corresponding set of indexes are generated from the plurality of texel codes. Each index of the set of indexes includes an index identifier. The process then proceeds to step 286 where the indexes are stored in a corresponding order to the uncompressed video texture map to produce a compressed texture map. Having done this, the process proceeds to step 288 wherein a mapping point is received. The mapping point corresponds to the particular point mentioned with reference to FIGS. 1 through 4. Having received the mapping point, the process proceeds to step 290 where a particular set of indexes is determined based on the mapping point. Having done this, the process proceeds to step 292 where corresponding texels are determined based on the index and texel identifiers.

Figure 18:
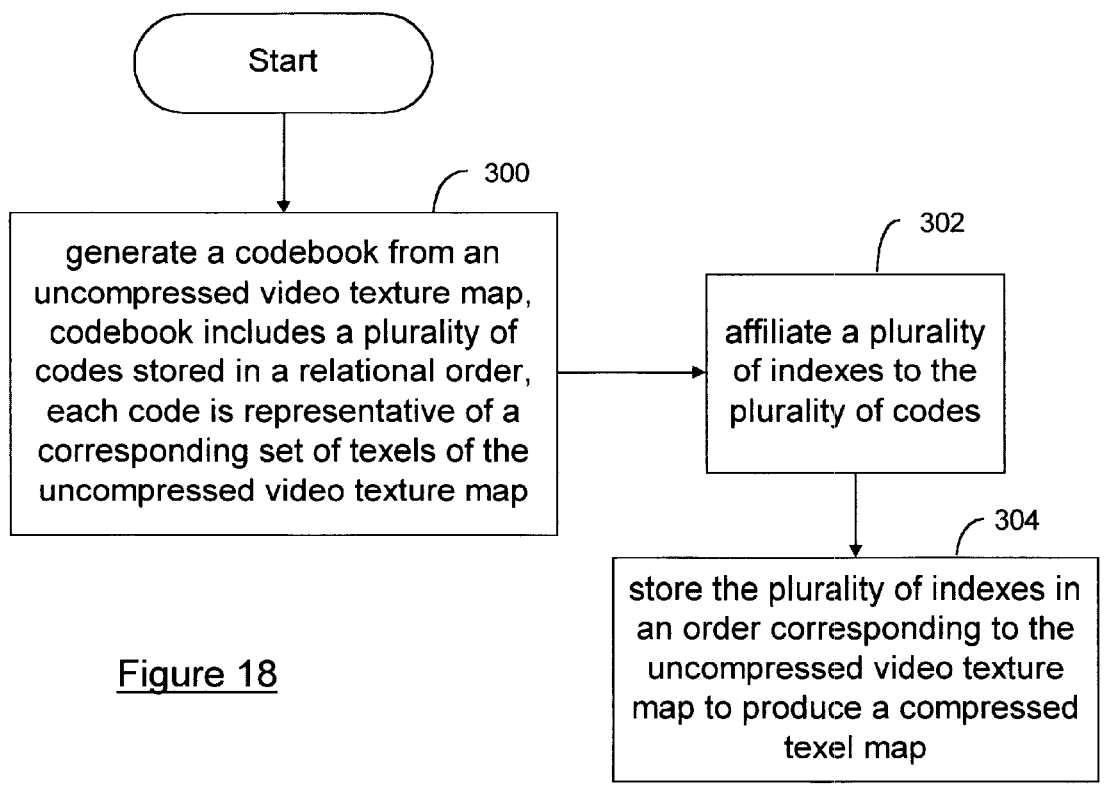
FIG. 18 illustrates a logic diagram which maybe used to generate a codebook using yet another alternate method in accordance with the present invention.

FIG. 18 illustrates a logic diagram that may be used to implement yet another method for video texture compression by the video graphic circuit 10. The process begins at step 300 where a codebook is generated for an uncompressed video texture map. The codebook includes a plurality of texel codes which are stored in a relational order. Such a relational order may be a toggling of the most significant bit and/or the least significant bit of the corresponding addresses of the texel codes. Note that each of the texel codes in the codebook represents a corresponding set of texels which may number anywhere from 2 to 64, of the uncompressed video texture map.

The process continues at step 302 where each of a plurality of indexes are affiliated with corresponding ones of the plurality of texel codes. In other words, each texel code of the codebook has a corresponding index such that it can be subsequently retrieved. The process then proceeds to step 304 where the plurality of indexes are stored in an order corresponding to the uncompressed video texture map to produce a compressed texel map.

Figure 19:
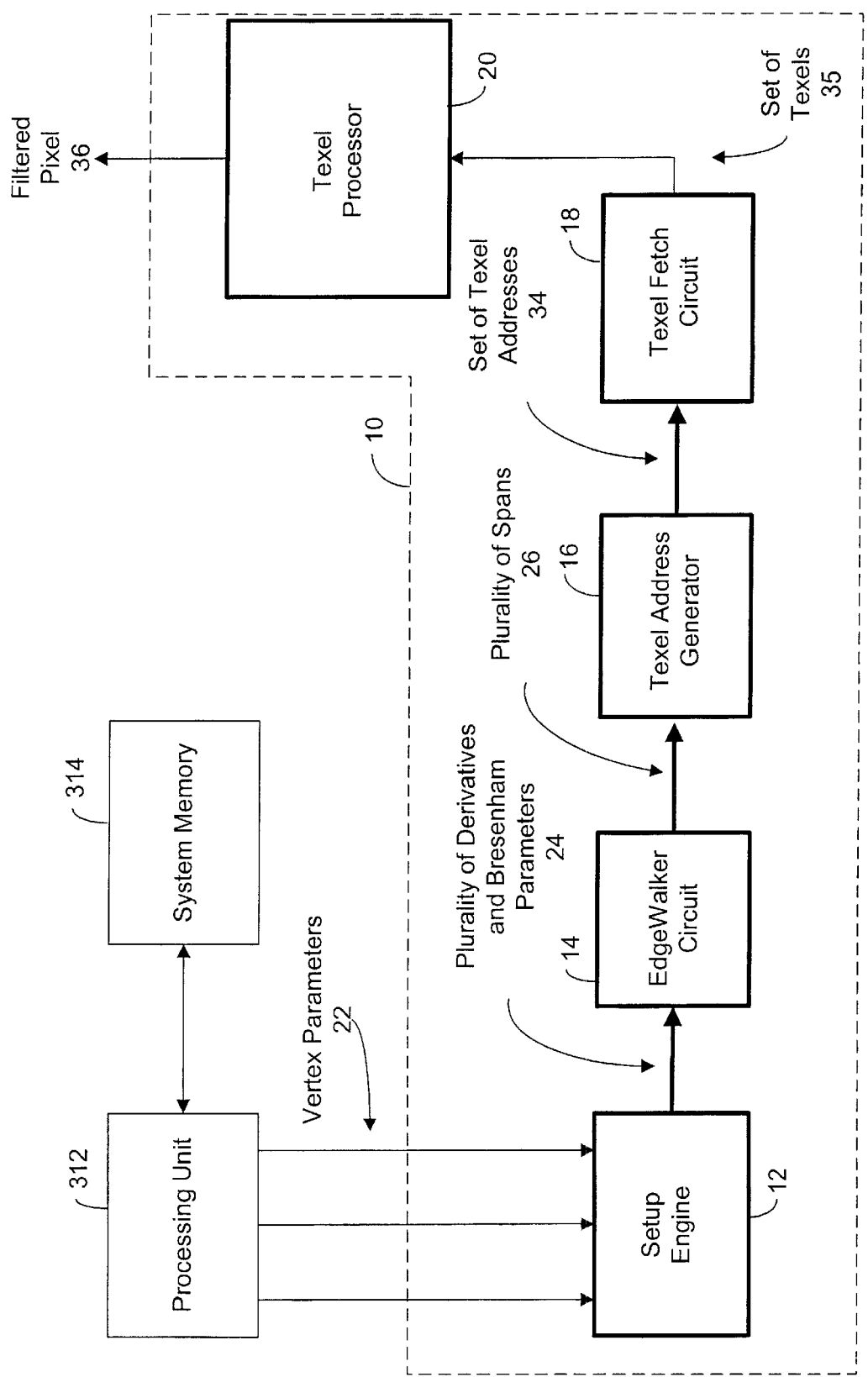
FIG. 19 illustrates a schematic block diagram of a computing system which is in accordance with the present invention.

FIG. 19 illustrates a computer system 310 that includes a processing unit 312, system memory 314, and a three-dimensional graphics processor 10. The three-dimensional graphics processor includes the set up engine 12, the edge-walker circuit 14, a texel address generator 16, the texel fetch circuit 18, and the texel processor 20. The function of the three-dimensional graphics processor 10 is as discussed with reference to the preceding eighteen figures.

The processing unit 312 may be a microprocessor, microcontroller, digital signal processor, central processing unit, or any other processing device that manipulates digital data based on operational instructions. In operation the processing unit receives video graphics programming instructions and video graphics data from the system memory 314 and subsequently produces the vertex parameters 32.

The computing system 310 may be employed in a personal computer, a work station, a video game device, or within a television. The operational instructions provided from the system memory 314 to the processing unit 312 vary depending on the particular video information to be presented. In addition, if the device is incorporated into a television monitor, the processing unit may receive television broadcast through a television tuner, and subsequently process the television broadcast to produce the vertex parameters 32.

The proceeding discussion has presented a method and apparatus for an efficient and economical three-dimensional graphics processor. In essence, by utilizing a floating point set up engine in conjunction with an edgewalker circuit, a texel address generator, a texel fetch circuit, and a texel processor, an economical and high-quality video graphics processor may be achieved. As one skilled in the art will readily appreciate, there are various implementations that incorporate the teachings of the present invention and only a few of them have been provided.

What is claimed is:

1. A method for video texture compression, the method comprising:
   a) accessing an uncompressed video texture map, wherein the uncompressed video texture map includes a plurality of texels and wherein the plurality of texels is representative of an image;
   b) generating a codebook for the uncompressed video texture map, wherein the codebook includes a plurality of codes, wherein each of the plurality of codes is representative of a corresponding set of the plurality of texels;
   c) generating a corresponding plurality of index identifiers for the plurality of codes that identify each texel in the corresponding set of the plurality of texels, wherein each of the plurality of index identifiers has associated therewith a set of texel identifiers; and
   d) storing the plurality of index identifiers in an order corresponding to the uncompressed video texture map to produce a compressed texel map.

2. The method of claim 1 further comprises, within step (b), generating the codebook by storing the plurality of codes in a relational order.

3. The method of claim 1 further comprises toggling of at least one of most significant bit of memory addresses of successive ones of the plurality of codes to establish the relational order.

4. The method of claim 1 further comprises toggling of at least one of least significant bit of memory addresses of successive ones of the plurality of codes to establish the relational order.

5. The method of claim 1 further comprises, within step (b), generating the codebook by selecting the plurality of codes from a super-set of codes.

6. The method of claim 1 further comprises:
   receiving a mapping point, wherein the mapping point is representative of a point on the uncompressed video texture map;
   determining a particular set of index identifiers and a corresponding one of the set of texel identifiers for each of the sets of index identifiers based on the mapping point; and
   identifying corresponding texels for the mapping point based on the corresponding one of the set of texel identifiers and the particular set of index identifiers.

7. The method of claim 6 further comprises determining the particular set of index identifiers based on texels in a predetermined proximity to the mapping point.

8. The method of claim 1 further comprises, with step (b), generating a plurality of codebooks for the uncompressed video texture map, wherein each of the plurality of codebooks include the corresponding plurality of index identifiers.

9. A method for video texture compression, the method comprising:
   a) generating a codebook for an uncompressed video texture map, wherein the codebook includes a plurality of codes stored in a relational order, wherein each of the plurality of codes is representative of a corresponding set of texels of the uncompressed video texture map;
   b) affiliating a plurality of index identifiers to the plurality of codes and, for each of the plurality of index identifiers, affiliating a set of texel identifiers to texels of the corresponding set of texels; and
   c) storing the plurality of index identifiers in an order corresponding to the uncompressed video texture map to produce a compressed texel map.

10. The method of claim 9 further comprises, within step (c) storing the plurality of index identifiers in the order based on mapping of the plurality of codes on to the uncompressed video texture map.

11. The method of claim 9 further comprises toggling of at least one of most significant bit of memory addresses of successive ones of the plurality of codes to establish the relational order.

12. The method of claim 9 further comprises toggling of at least one of least significant bit of memory addresses of successive ones of the plurality of codes to establish the relational order.

13. A video texture compression circuit comprising:
   codebook generator operably coupled to generate a codebook for an uncompressed video texture map which includes a plurality of texels representing an image, wherein the codebook includes a plurality of codes, and wherein each of the plurality of codes is representative of a corresponding set of the plurality of texels;
   index generator operably coupled to the codebook generator, wherein the index generator generates a corresponding plurality of index identifiers for the plurality of codes and farther generates a set of texel identifiers; and
   memory that stores the plurality of indexes in an order corresponding to the uncompressed video texture map to produce a compressed texel map.

14. The video texture compression circuit of claim 13 further comprises an address generation unit that generates a plurality of addresses for storing the codebook in a relational order by either toggling of at least one of most significant bit of the plurality of addresses or toggling of at least one of least significant bit of the plurality of addresses.

15. The video texture compression circuit of claim 13 further comprises:
   a mapping circuit operably coupled to the index generator and to receive a mapping point which represents a point on the uncompressed video texture map, wherein the mapping circuit determines a particular set of index identifiers based on the mapping point and further determines corresponding texels based on corresponding ones of the index identifier of each of the particular set of index identifiers.

16. The video texture compression circuit of claim 13 further comprises the codebook generator generating a plurality of codebooks for the uncompressed video texture map, wherein each of the plurality of codebooks includes the corresponding plurality of index identifiers.

17. A video texture compression circuit comprising:
codebook generator operably coupled to generate a codebook for an uncompressed video texture map, wherein the codebook includes a plurality of codes stored in a relational order, wherein each of the plurality of codes is representative of a corresponding set of the plurality of texels;
index generator operably coupled to affiliate a plurality of index identifiers to the plurality of codes and, for each of the plurality of index identifiers, affiliate a set of texel identifiers to texels of the corresponding set of texels; and
memory operably coupled to store the plurality of index identifiers in an order corresponding to the uncompressed video texture map to produce a compressed texel map.

18. The video texture compression circuit of claim 17 further comprises an address generation unit that generates a plurality of addresses for storing the codebook in the relational order by either toggling of at least one of most significant bit of the plurality of addresses or toggling of at least one of least significant bit of the plurality of addresses.

19. The video texture compression circuit of claim 17 further comprises:
a mapping circuit operably coupled to the index generator and to receive a mapping point which represents a point on the uncompressed video texture map, wherein the mapping circuit determines a particular set of index identifiers based on the mapping point and further determines corresponding texels based on a corresponding one of the set of texel identifiers of each of the particular set of index identifiers.

20. A digital storage medium for storing programming instructions that, when read by a processing device, causes the processing device to perform video texture compression, the digital storage medium comprising:
first means for storing programming instructions that, when read by the processing device, causes the processing device to access an uncompressed video texture map, wherein the uncompressed video texture map includes a plurality of texels and wherein the plurality of texels is representative of an image;
second means for storing programming instructions that, when read by the processing device, causes the processing device to generate a codebook for the uncompressed video texture map, wherein the codebook includes a plurality of codes, wherein each of the plurality of codes is representative of a corresponding set of the plurality of texels;
third means for storing programming instructions that, when read by the processing device, causes the processing device to generate a corresponding plurality of index identifiers for the plurality of codes that identify each texel in the corresponding set of the plurality of texels, wherein each of the plurality of index identifiers has associated therewith a set of texel identifiers; and
fourth means for storing programming instructions that, when read by the processing device, causes the processing device to store the plurality of index identifiers in an order corresponding to the uncompressed video texture map to produce a compressed texel map.

21. A digital storage medium for storing programming instructions that, when read by a processing device, causes the processing device to perform video texture compression, the digital storage medium comprising:
first means for storing programming instructions that, when read by the processing device, causes the processing device to generate a codebook for an uncompressed video texture map, wherein the codebook includes a plurality of codes stored in a relational order, wherein each of the plurality of codes is representative of a corresponding set of the plurality of texels;
second means for storing programming instructions that, when read by the processing device, causes the processing device to affiliate a plurality of index identifiers to the plurality of codes and, for each of the plurality of index identifiers, to affiliate a set of texel identifiers to texels of the corresponding set of texels; and
third means for storing programming instructions that, when read by the processing device, causes the processing device to store the plurality of index identifiers in an order corresponding to the uncompressed video texture map to produce a compressed texel map.

22. The method according to claim 1, wherein each texel identifier being an identifier into the texture map for reviewing a minimum number of texels that are filtered to provide a texture value for a given pixel in a rendered image.

23. The method according to claim 1, wherein each texel identifier identifies which portion, of a plurality of portions of a respective texel code, contains a texel of interest.

24. The method according to claim 1, wherein each texel identifier identifies whether the texel of interest is in a lower-right, lower-left, upper-right, or upper-left portion of a respective texel code.

25. The method according to claim 9, wherein each texel identifier is an identifier into the texture map for reviewing a minimum number of texels that are filtered to provide a texture value for a given pixel in a rendered image.

26. The method according to claim 9, wherein each texel identifier identifies which portion, of a plurality of portions of a respective texel code, contains a texel of interest.

27. The method according to claim 9, wherein each texel identifier identifies whether the texel of interest in a lower-right, lower-left, upper-right, or upper-left portion of a respective texel code.

28. The video texture compression circuit of claim 13, wherein each texel identifier is an identifier into the texture map for reviewing a minimum number of texels that are filtered to provide a texture value for a given pixel in a rendered image.

29. The video texture compression circuit according to claim 13, wherein each texel identifier identifies which portion, of a plurality of portions of a respective texel code, contains a texel of interest.

30. The video texture compression circuit according to claim 13, wherein each texel identifier identifies whether the texel of interest is in a lower-right, lower-left, upper-right, or upper-left portion of a respective texel code.

31. The video texture compression circuit according to claim 17, wherein each texel identifier is an identifier into the texture map for reviewing a minimum number of texels that are filtered to provide a texture value for a given pixel in a rendered image.

32. The video texture compression circuit according to claim 17, wherein each texel identifier identifies which portion, of a plurality of portions of a respective texel code, contains a texel of interest.

33. The video texture compression circuit according to claim 17, wherein each texel identifier identifies whether the texel of interest is in a lower-right, lower-left, upper-right, or upper-left portion of a respective texel code.

34. The digital storage medium according to claim 20, wherein each texel identifier is an identifier into the texture map for reviewing a minimum number of texels that are filtered to provide a texture value for a given pixel in a rendered image.

35. The digital storage medium according to claim 20, wherein each texel identifier identifies which portion, of a plurality of portions of a respective texel code, contains a texel of interest.

36. The digital storage medium according to claim 20, wherein each texel identifier identifies whether the texel of interest is in a lower-right, lower-left, upper-right, or upper-left portion of a respective texel code.

37. The digital storage medium according to claim 21, wherein each texel identifier is an identifier into the texture map for reviewing a minimum number of texels that are filtered to provide a texture value for a given pixel in a rendered image.

38. The digital storage medium according to claim 21, wherein each texel identifier identifies which portion, of a plurality of portions of a respective texel code, contains a texel of interest.

39. The digital storage medium according to claim 21, wherein each texel identifier identifies whether the texel of interest is in a lower-right, lower-left, upper-right, or upper-left portion of a respective texel code.

* * * * *